United States Patent
Cho et al.

(10) Patent No.: US 11,775,566 B2
(45) Date of Patent: Oct. 3, 2023

(54) ELECTRONIC DEVICE AND METHOD FOR CONTROLLING THE ELECTRONIC DEVICE THEREOF

(71) Applicant: SAMSUNG ELECTRONICS CO., LTD., Suwon-si (KR)

(72) Inventors: Yongjin Cho, Suwon-si (KR); Hyunsang Jeon, Yongin-si (KR); Seunghyun Kim, Suwon-si (KR); Taeyeon Kim, Seoul (KR); Hyungmin Lee, Seoul (KR); Jinsung Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 137 days.

(21) Appl. No.: 17/168,965

(22) Filed: Feb. 5, 2021

(65) Prior Publication Data

US 2021/0248163 A1   Aug. 12, 2021

(30) Foreign Application Priority Data

Feb. 6, 2020 (KR) .......................... 10-2020-0014315

(51) Int. Cl.
  *G06F 16/33* (2019.01)
  *G06F 16/93* (2019.01)
  (Continued)

(52) U.S. Cl.
  CPC ........ *G06F 16/285* (2019.01); *G06F 16/3331* (2019.01); *G06F 16/93* (2019.01); *G06N 20/00* (2019.01)

(58) Field of Classification Search
  CPC .... G06F 16/285; G06F 16/3331; G06F 16/93; G06N 20/00
  (Continued)

(56) References Cited

U.S. PATENT DOCUMENTS 5,574,828 A * 11/1996 Hayward ............... G06N 5/022
                                                                706/45
5,896,403 A *  4/1999 Nagasaki ............. H04N 1/2162
(Continued)

FOREIGN PATENT DOCUMENTS

CN     112102127 B    6/2021
JP     2018-37832 A   3/2018
(Continued)

OTHER PUBLICATIONS

Communication dated May 24, 2021, issued by the International Searching Authority in counterpart International Application No. PCT/KR2021/001468 (PCT/ISA/210 and 237).

*Primary Examiner* — Kuen S Lu
(74) *Attorney, Agent, or Firm* — Sughrue Mion, PLLC

(57) ABSTRACT

An electronic device and a method for controlling the electronic device are provided. The method includes obtaining an image including at least one question through a camera of the electronic device; identifying the at least one question in the image; identifying scoring information marked by a user for the at least one question in the image; classifying the at least one question according to the scoring information; and based on receiving a user command for displaying an incorrect answer note, displaying a question classified as an incorrect answer question among the at least one question.

17 Claims, 36 Drawing Sheets

(51) Int. Cl.
   *G06N 20/00*         (2019.01)
   *G06F 16/28*         (2019.01)
(58) Field of Classification Search
   USPC .......................................................... 707/740
   See application file for complete search history.

(56) References Cited

U.S. PATENT DOCUMENTS

| | | | |
|---|---|---|---|
| 8,744,837 B2 | 6/2014 | Heo et al. | |
| 2004/0023198 A1* | 2/2004 | Youngman | G09B 5/065 |
| | | | 434/262 |
| 2004/0044955 A1* | 3/2004 | Shimada | G06V 10/987 |
| | | | 715/201 |
| 2015/0187219 A1* | 7/2015 | Sheppard | G06T 3/00 |
| | | | 434/354 |
| 2015/0199598 A1 | 7/2015 | Iams | |
| 2015/0294191 A1* | 10/2015 | Zhang | G06K 9/6272 |
| | | | 382/160 |
| 2018/0061263 A1 | 3/2018 | Nishihara | |
| 2019/0095760 A1* | 3/2019 | Kudo | G06K 9/6262 |
| 2021/0064964 A1* | 3/2021 | Katz | G06N 5/041 |
| 2021/0065028 A1* | 3/2021 | Beller | G06N 20/00 |

FOREIGN PATENT DOCUMENTS

| | | |
|---|---|---|
| JP | 2019-113611 A | 7/2019 |
| KR | 10-0983536 B1 | 9/2010 |
| KR | 10-2012-0065071 A | 6/2012 |
| KR | 10-1173561 B1 | 8/2012 |
| KR | 10-2015-0041897 A | 4/2015 |
| KR | 10-1648756 B1 | 8/2016 |
| KR | 10-1671693 B1 | 11/2016 |
| KR | 10-1934481 B1 | 1/2019 |
| KR | 10-2019-0052410 A | 5/2019 |

\* cited by examiner

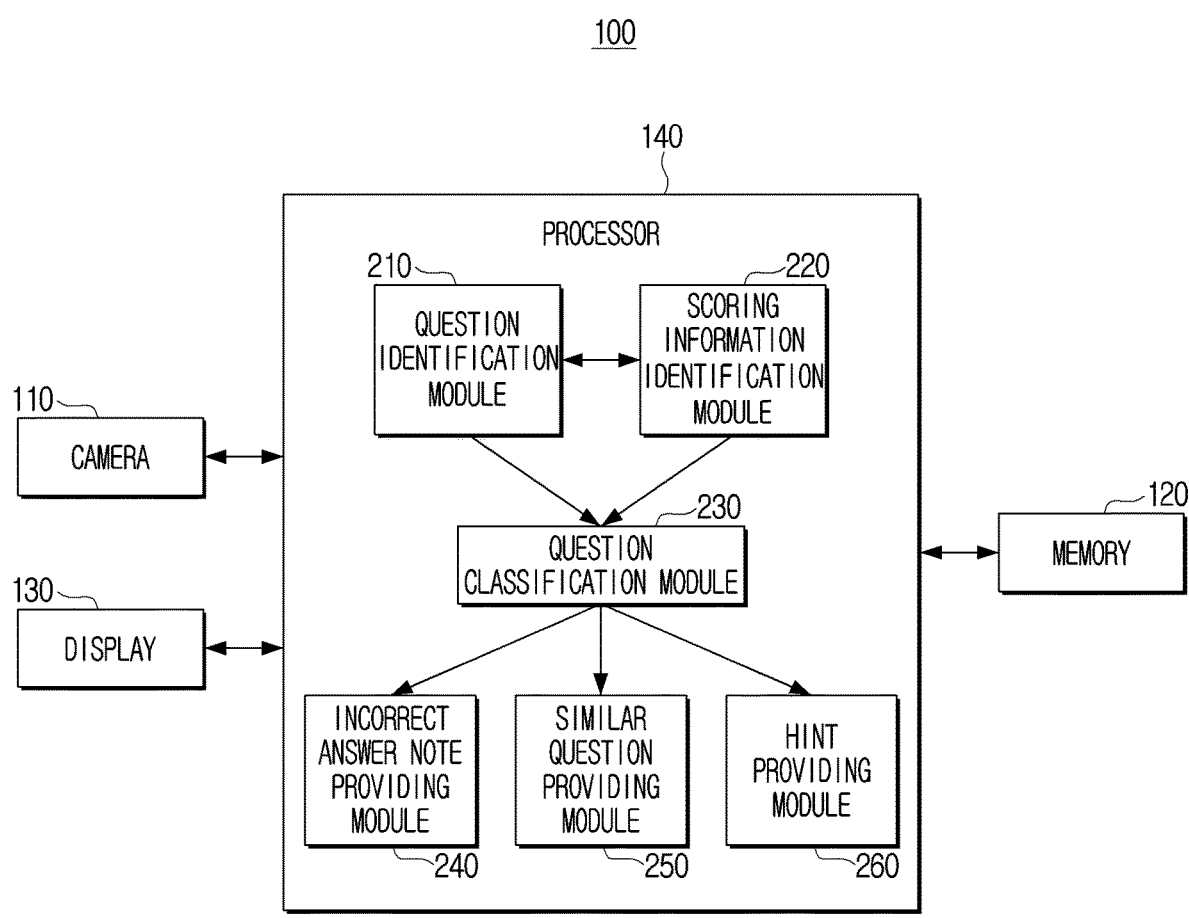

Q. THERE IS A RECTANGLE HAVING CIRCUMFERENCE LENGTH OF 40 cm AND AREA OF 96 cm².
OBTAIN HORIZONTAL LENGTH. (HOWEVER, HORIZONTAL LENGTH IS LONGER THAN VERTICAL LENGTH)

| RECTANGLE | HAVING | CIRCUMFERENCE | LENGTH | OF | 40cm | AND | AREA | OF | 96cm² |

| OBTAIN | HORIZONTAL | LENGTH |

| HOWEVER, | HORIZONTAL | LENGTH | IS | LONGER | THAN | VERTICAL | LENGTH |

ELECTRONIC DEVICE AND METHOD FOR CONTROLLING THE ELECTRONIC DEVICE THEREOF

CROSS-REFERENCE TO RELATED APPLICATION(S)

This application is based on and claims priority under 35 U.S.C. § 119 to Korean Patent Application No. 10-2020-0014315, filed on Feb. 6, 2020, in the Korean Intellectual Property Office, the disclosure of which is incorporated by reference herein in its entirety.

BACKGROUND

1. Field

The disclosure relates to an electronic device and a method for controlling the same, and more particularly, to an electronic device that displays a question acquired through a camera according to scoring information, and a method for controlling the same.

2. Description of the Related Art

With the recent development of information and communication technology, curriculum of elementary, middle, and high school students, educational media related to entrance exams, and educational media targeting adults are expanding from print-based learning methods, such as books, to new learning methods based on the Internet using users' electronic devices, such as smartphones.

However, since most learning systems grafted with the Internet and users' electronic devices are still performed by downloading or streaming text, images, and video content uploaded or linked by a learning system service provider, there is a problem in that these learning systems are insufficient to be connected with education traditionally performed offline, and it is difficult to perform additional management or feedback according to learner's offline achievement level.

SUMMARY

Provided are an electronic device that classifies questions acquired through a camera according to scoring information, displays the classified questions according to the scoring information, and provides hint information on the classified questions and similar questions thereto, and a method for controlling the same.

According to an embodiment, there is provided an electronic device, including: a camera; a display; a memory configured to store at least one instruction; and a processor configured to execute the at least one instruction. The processor is configured to: obtain an image including at least one question through the camera; identify the at least one question in the image; identify scoring information marked by a user for the at least one question in the image; classify the at least one question according to the scoring information; and based on receiving a first user command for displaying an incorrect answer note, control the display to display a question classified as an incorrect answer question among the at least one question.

The processor is further configured to: identify at least one paragraph included in the image; identify at least one from among text information, image information and equation information included in the at least one paragraph; and identify condition information and target information of the at least one question based on the at least one from among the text information, the image information, and the equation information.

The processor is further configured to obtain a type of each of the at least one question based on at least one from among the image information, the equation information, the condition information and the target information.

The scoring information is determined based on a symbol marked by a user in the at least one question, and the processor is further configured to: classify the at least one question as one from among a correct answer question, a confirmation question, and the incorrect answer question based on the symbol marked by the user on the at least one question, and control the display to display one or more questions classified as the incorrect answer question among the at least one question in an order in which the one or more questions are classified as the incorrect answer question.

The processor is further configured to, based on one of the at least one question being selected by the user, control the display to display at least one similar question corresponding to the selected question, and a type of the at least one similar question is same as a type of the selected question.

The processor is further configured to: identify an achievement level of the user by a question type according to the scoring information; and control the display to display at least one similar question corresponding to the selected question based on the achievement level.

The processor is further configured to switch a photographing mode of the camera to a wide-angle mode to acquire a second image including the at least one question.

The processor is further configured to: identify an achievement level of the user by a question type according to the scoring information; and based on receiving a second user command for displaying hint information for the at least one question, control the display to display a UI (User Interface) for displaying the hint information on the at least one question based on the achievement level of the user.

The hint information is pre-stored hint template information corresponding to a type of the at least one question.

The hint information is generated based on a hint template DB (Database) selected by the user among a plurality of hint template DBs.

According to an embodiment, there is provided a method for controlling an electronic device, the method including: obtaining an image including at least one question through a camera of the electronic device; identifying the at least one question in the image; identifying scoring information marked by a user for the at least one question in the image; classifying the at least one question according to the scoring information; and based on receiving a first user command for displaying an incorrect answer note, displaying a question classified as an incorrect answer question among the at least one question.

The identifying the at least one question includes: identifying at least one paragraph included in the image; identifying at least one from among text information, image information and equation information included in the at least one paragraph; and identifying condition information and target information of the at least one question based on the at least one from among the text information, the image information, and the equation information.

The method further includes obtaining a type of each of the at least one question based on at least one from among the image information, the equation information, the condition information and the target information.

The scoring information is determined based on a symbol marked by a user in the at least one question, and the classifying the at least one question includes classifying the at least one question as one from among a correct answer question, a confirmation question, and the incorrect answer question of the at least one question based on the symbol marked by the user on the at least one question, and the displaying the question classified as the incorrect answer question includes displaying one or more questions classified as the incorrect answer question among the at least one question in an order in which the one or more questions are classified as the incorrect answer question.

The method further includes: based on one of the at least one question being selected by the user, displaying at least one similar question corresponding to the selected question, and a type of the at least one similar question is same as a type of the selected question.

The method further includes: identifying an achievement level of the user by a question type according to the scoring information, and the displaying further includes displaying at least one similar question corresponding to the selected question based on the achievement level.

The obtaining the image including the at least one question includes switching a photographing mode of the camera to a wide-angle mode to acquire a second image including the at least one question.

The method further includes: identifying an achievement level of the user by a question type according to the scoring information; and based on receiving a second user command for displaying hint information for the at least one question, displaying a UI including the hint information for the at least one question based on the achievement level of the user.

The hint information is pre-stored hint template information corresponding to a type of the at least one question.

The hint information is generated based on a hint template DB selected by the user among a plurality of hint template DBs.

Additional aspects will be set forth in part in the description which follows, and in part, will be apparent from the description, or may be learned by practice of the presented embodiments.

BRIEF DESCRIPTION OF THE DRAWINGS

The above and other aspects, features and advantages of certain embodiments will become more apparent from the following description, taken in conjunction with the accompanying drawings, in which:

FIG. 1 is a block diagram illustrating an electronic device according to an embodiment;

DETAILED DESCRIPTION

Figure 2A:
FIG. 2A is a diagram illustrating a method for identifying a question included in an image according to an embodiment.

FIG. 1 is a block diagram illustrating an electronic device according to an embodiment.

Referring to FIG. 1, an electronic device 100 may include a camera 110, a memory 120, a display 130, and a processor 140. The electronic device 100 may be implemented in various types of electronic devices such as a smart phone, AR glasses, a tablet PC, a mobile phone, a video phone, an e-book reader, a TV, a desktop PC, a laptop PC, a netbook computer, a workstation, a camera, a smart watch, etc.

The camera 110 is disposed on one side of the electronic device 100, and is a component for acquiring an image including at least one question with which scoring information is displayed by a user. The camera 110 may photograph or capture a still image or a moving image. The camera 110 may photograph or capture an exercise book including at least one question as a still image and acquire an image including at least one question.

In another embodiment, the processor 140 may identify at least one question from an image displayed on the display 130 through the camera 110. That is, the processor 140 may identify at least one question without an input for photographing a separate image while the exercise book image is displayed on the display 130 through the camera 110. A method for photographing an image including at least one question by the camera 110 will be described later with reference to FIGS. 5A to 7B.

The camera 110 may be a stereo camera including a plurality of lenses. The camera 110 may also include a wide-angle lens. In this case, the electronic device 100 may photograph an image including a plurality of questions in a wide-angle mode using the wide-angle lens of the camera 110.

The memory 120 may store various programs and data required for an operation of the electronic device 100. In detail, at least one instruction may be stored in the memory 120. The processor 140 may perform the operation of the electronic device 100 by executing the at least one instruction stored in the memory 120.

The memory 120 may be implemented as a non-volatile memory, a volatile memory, a flash memory, a hard disc drive (HDD), a solid state drive (SSD), or the like. The memory 120 is accessed by the processor 140, and the processor 140 may be configured to perform a readout, a recording, a correction, a deletion, an update, and the like, of data stored in the memory 120. The memory 120 may include a read only memory (ROM), a random access memory (RAM), or a memory card (for example, a micro secure digital (SD) card or a memory stick) connected to the electronic device 100. In addition, the memory 120 may store programs and data for configuring various screens to be displayed on a display area of the display.

At least one question identified by an image including at least one question may be stored in the memory 120. Specifically, the image including at least one question may be photographed by the camera 110, and the at least one question may be identified in the photographed image and stored in the memory 120.

In addition, at least one question may be classified and stored in the memory 120 according to scoring information. According to an embodiment, the scoring information may be displayed on at least one question by a user, and the scoring information on the at least one question may be identified by the camera 110.

The display 130 may display various types of information according to the control of the processor 140. In particular, when a user command for displaying an incorrect answer note is input, the display 130 may display a question processed as an incorrect answer among at least one question stored in the memory 120. However, the embodiment is not limited thereto, and when a user command for displaying an incorrect answer note is input, the display 130 may display a question processed as a confirmation question among at least one question stored in the memory 120.

According to an embodiment, when a user command for displaying a similar question to a question displayed on the display 130 is input, the display 130 may display a similar question corresponding to the question displayed on the display 130.

According to an embodiment, when a user command for displaying a hint for a question displayed on the display 130 is input, the display 130 may display information on a hint corresponding to the question displayed on the display 130.

The display 130 may be implemented as various types of displays such as a liquid crystal display (LCD) panel, a light emitting diode (LED), an organic light emitting diode (OLED), a liquid crystal on silicon (LCoS), digital light processing (DLP), and the like. In addition, a driving circuit, a backlight unit, and the like, that may be implemented in a form such as a-si TFT, low temperature poly silicon (LTPS) TFT, an organic TFT (OTFT), and the like, and may be included in the display 130.

In addition, the display 130 may be implemented as a touch screen display including a touch panel. However, the display 130 is not limited to the embodiments described above, and the display 130 may be implemented in various forms other than the embodiments described above.

The processor 140 may include one or more processors. In this case, one or more processors may be a general-purpose processor such as a central processing unit (CPU) and an application processor (AP), or a graphics dedicated processor such as a graphics processing unit (GPU) and a visual processing unit (VPU), or an artificial intelligence dedicated processor such as a neural processing unit (NPU).

One or more processors 140 may be configured to process input data according to a predefined operation rule or an artificial intelligence model stored in the memory 120. The predefined operation rule or the artificial intelligence model may be obtained through learning. Here, the learning may mean that a predefined operation rule or an artificial intelligence model of a desired characteristic is generated by applying a learning algorithm to a plurality of learning data. Such learning may be performed by the electronic device itself in which the artificial intelligence capability is included according to an embodiment, or may be performed by a separate server and/or system to transmitted to the electronic device according to another embodiment.

The AI model may include a plurality of neural network layers. Each layer includes a plurality of weight values, and a calculation of the layers is performed based on a calculation result of a previous layer and a calculation of a plurality of weight values. Examples of neural networks may include models such as a convolutional neural network (CNN), a deep neural network (DNN), a recurrent neural network (RNN), a restricted Boltzmann machine (RBM), a deep belief network (DBN), a bidirectional recurrent deep neural network (BRDNN), and deep Q-networks. However, the neural networks are not limited thereto, and may include other neural networks that may be suitable to implement the embodiments of the disclosure.

The processor 140 may be electrically connected to the memory 120 to control overall operations and functions of the electronic device 100. In particular, the processor 140 may provide a learning assistance function for identifying at least one question in an image acquired through a camera, classifying the identified question, and providing an incorrect answer note, a hint, and an explanation.

The learning assistance function may be implemented as an application for a learning assistance function of a smart phone or AR glasses. FIG. 1 illustrates that the learning assistant function is implemented by the processor 140, but is not limited thereto, and the learning assistant function may be implemented in an external server.

Referring to FIG. 1, the processor 140 may be configured to implement the learning assistance function by executing a question identification module 210, a scoring information identification module 220, a question classification module 230, an incorrect answer note providing module 240, a similar question providing module 250, and a hint providing module 260.

According to an embodiment, when the electronic device 100 is implemented as a smart phone, the learning assistance function according to an embodiment may be implemented through an artificial intelligence service (for example, Bixby) of the electronic device 100. For example, when a user inputs a physical button for executing the artificial intelligence service of the electronic device 100 or executes the artificial intelligence service while executing the camera function of the electronic device 100, a module related to the learning assistant function may be loaded onto a memory (for example, a volatile memory) included in the processor 140.

As an example, a plurality of modules for implementing the learning assistant function may be implemented in respective software, but is not limited thereto, and some modules may be implemented as hardware. In another embodiment, the plurality of modules may be implemented in one software. In addition, some modules may be implemented in the electronic device 100, and other modules may be implemented in an external server.

When an image including at least one question is photographed by the camera 110, the question identification module 210 and the scoring information identification module 220 stored in the memory 120 may be loaded onto the memory (for example, volatile memory) included in the processor 140. In this case, the question identification module 210 and the scoring information identification module 220 may be loaded at the same time or may be sequentially loaded.

The question identification module 210 may identify at least one question in an image photographed by the camera 110.

Specifically, the question identification module 210 may identify at least one paragraph in the photographed image. One paragraph according to the disclosure may mean one question unit. That is, the photographed image may include a plurality of question paragraphs, and one of the plurality of question paragraphs included in the image may be identified.

When at least one paragraph is identified, the question identification module 210 may input the identified question paragraph into the question identification model in the form of the image. The question identification model is a model for identifying questions included in the image by analyzing the input image. For example, the question identification model may be an artificial intelligence model for image processing. In particular, according to the embodiment, the question identification model may identify text information, figure information, and equation information included in an image. The text information may include characters forming a question, and may include any combination of words, phrases, symbols, punctuations, clauses, etc. Further, the figure information may include shape information such as a triangle, a rectangle, and a trapezoid, and may also include information on a graph. In addition, the equation information may include information obtained by converting the equation included in the question into a latex form.

When the text information, the figure information, and the equation information are identified, the question identification module 210 may identify condition information and target information of the question identified by at least one of the text information, figure information, and equation information identified by the question identification model. The condition information may include at least one condition for solving the identified question, and the target information may include information on a value to be obtained from the identified question. For example, in a mathematical question stating "calculates an area of a colored part in a graph for two quadratic functions A and B", the question identification model can identify the text information, the figure information, and the equation information included in the identified question. Here, the question identification module 210 may identify first condition information (i.e., two quadratic function graphs) and second condition information (i.e., two points, vertices of graphs of the two quadratic functions A and B) through the text information. In addition, the question identification module 210 may identify the target information (i.e., area of the colored part) through the text information.

The scoring information identification module 220 may identify scoring information on at least one question included in an image photographed by the camera 110. According to the embodiment, the scoring information may be information for classifying at least one question included in an image photographed by the camera 110 into one of a correct answer question, a confirmation question, or an incorrect answer question.

The at least one question may be scored by a user. That is, a user may mark symbols such as circles, triangles, and Xs on the number corresponding to each question with a pen or pencil to perform scoring. The scoring information may be information on a symbol image displayed in at least one question by a user. The scoring information identification module 220 may identify a symbol in a question and identify the scoring information corresponding to the identified symbol.

For example, when a number corresponding to each question is marked with a circle symbol, the scoring information identification module 220 may identify the corresponding question as a correct answer question. Here, the correct answer question may be a question that the user correctly answered to the corresponding question.

In addition, when the numbers corresponding to questions are marked with at least one of a check, an asterisk, or a triangle, the scoring information identification module 220 may identify the corresponding question as a confirmation question. Here, the confirmation question may be a question that the user correctly answered, but in which a method of arriving at a solution is not clear. Alternatively, the confirmation question may be a question recognized by the user as an important question. However, the confirmation question is not limited thereto, and the confirmation question may include various questions that the user wants to classify as the confirmation question.

According to an embodiment, when a symbol in a question is identified with at least one of an asterisk or a triangle symbol, the scoring information identification module 220 may identify the question as a confirmation question.

For example, when a symbol in a question is identified as an asterisk, the scoring information identification module 220 may identify the question as at least one of a first confirmation question and a second confirmation question depending on the number or size of asterisks. Specifically, when the number of identified asterisks is one, the scoring information identification module 220 may identify the question as the first confirmation question. When the number of identified asterisks is two, the scoring information identification module 220 may identify the question as the second confirmation question. Here, the second confirmation question may be a question recognized by the user as a more important question than the first confirmation question.

In the above description, it has been described that the confirmation question is identified by dividing into the first confirmation question and the second confirmation question, but the confirmation question is not limited thereto, and the confirmation question may be identified by dividing into more than two confirmation questions or only as one confirmation question without being divided.

The method for dividing and identifying a confirmation question may be set by a user. For example, the user may set the confirmation question so that the confirmation question is identified by dividing into a first confirmation question, a second confirmation question, and a third confirmation question.

In addition, when the number of each question is marked with at least one of symbols such as a hatching symbol or an "X", the scoring information identification module 220 may identify the corresponding question as the incorrect answer question. The incorrect answer question may be a question that the user answers incorrectly to the corresponding question. When a symbol in a question is identified with a hatching symbol or an "X", the scoring information identification module 220 may identify the question as an incorrect answer question.

Furthermore, when a symbol in a question is identified with a hatching symbol, the scoring information identification module 220 may identify the question as a first incorrect answer question. When a symbol in a question is identified with an X symbol, the scoring information identification module 220 may identify the question as a second incorrect answer question. As an example, the second incorrect answer question may be a question recognized by a user as a more important incorrect answer question than the first incorrect answer question.

In the above description, it has been described that the incorrect answer question is identified by dividing into the first incorrect answer question and the second incorrect answer question, but the incorrect answer question is not limited thereto, and the incorrect answer question may be identified by dividing into two or more incorrect answer questions or only one incorrect answer question without being divided.

In addition, in the above description, when a symbol in a question is a hatching symbol or an X symbol, it has been described that the incorrect answer question is divided into the first incorrect answer question and the second incorrect answer question, but the embodiment is not limited thereto. That is, when the symbol identified is the X symbol, the scoring information identification module 220 may identify the question as the first incorrect answer question or the second incorrect answer question depending on a size or a thickness of the X symbol.

According to an embodiment, a method for dividing and identifying an incorrect answer question may be set by a user. For example, the user may set the incorrect answer question so that the incorrect answer question is identified by dividing into the first incorrect answer question, the second incorrect answer question, and the third incorrect answer question.

The question classification module 230 may classify at least one question included in the image based on the question identified by the question identification module 210 and the scoring information identified by the scoring information identification module 220, and store the classified at least one question in the memory 120.

As an example, the question classification module 230 may use the scoring information identified by the scoring information identification module 220 to classify the question identified by the question identification module 210 as one of a correct answer question, a confirmation question, and an incorrect answer question and store one of the questions in the memory 120.

As another example, the question classification module 230 may identify a type of at least one question identified by the question identification module 210. In addition, when the type of at least one question identified by the question identification module 210 is identified, the question classification module 230 may identify whether the identified type is included in one of a plurality of representative types pre-stored in the memory 120. When the question identified by the question identification module 210 is included in one of the plurality of representative types pre-stored in the memory 120, the question classification module 230 may classify the question identified by the question identification module 210 into the identified representative type and store the classified question in the memory 120. For example, the plurality of questions may be classified by representative type according to similarities between questions and stored in the memory 120.

According to an embodiment, the question classification module 230 may identify, based on a similarity model, a similarity between the plurality of questions pre-stored in the memory 120 and the question identified by the question identification module 210. By way of example, the similarity may be represented in a range between 1 to 100, and if a value indicating the similarity is high, the identified question is more likely to correspond to a type of one of the plurality of questions stored in the memory. That is, when information on a question identified by the question identification module 210 is input to the similarity model, the similarity between the input question and the plurality of questions pre-stored in the memory 120 may be acquired. However, one or more embodiments are not limited thereto, and a degree of similarity between the input question (or identified question by the question identification module 210) and the representative type pre-stored in the memory 120 may be acquired by various other means. The similarity model may be a model using a term frequency-inverse document frequency (TF-IDF) technique and a plus minus interest (PMI) technique. According to an embodiment, the similarity model may be an artificial intelligence model using a deep learning technique such as long short-term memory models (LSTM). Specifically, the similarity model may compare the question identified by the question identification module 210 with text information, equation information, figure information, condition information, and target information on the plurality of questions pre-stored in the memory 120, respectively, to acquire the similarity between the plurality of questions pre-stored in the memory 120 and the question identified by the question identification module 210. In addition, the question classification module 230 may identify whether the question identified by the question identification module 210 is included in one of the plurality of representative types pre-stored in the memory 120 based on the similarity acquired by the similarity model. For example, when the similarity between a first representative type pre-stored in the memory 120 and the question identified by the question identification module 210 is 80 or more, the question classification module 230 may classify the question identified by the question identification module 210 as the first representative type.

As another example, when the question identified by the question identification module 210 has similarity to each of the plurality of representative types pre-stored in the memory 120 which is less than or equal to a preset value (for example, 50 or less), the question classification module 230 may classify the question identified by the question identification module 210 as a new representative type. In addition, when a new representative type is identified by the question identification module 210, the processor 140 may store the identified new representative type in the memory 120. As an example, the processor 140 may generate and provide a hint template for a new representative type stored in the memory 120, and details thereof will be described later with reference to FIGS. 2D, 4A, and 4B.

According to an embodiment, the question classification module 230 may identify a user's achievement level for each representative type by using the scoring information identified by the scoring information identification module 220. As an example, the user's achievement level may be divided into 5 stages by the representative type. For example, when the user's achievement level for a representative type corresponding to the question identified by the question identification module 210 is four stages and when the question identified by the question identification module 210 is identified as the incorrect answer question, the user's achievement level for the corresponding representative type may change from a fourth stage to a third stage.

The incorrect answer note providing module 240 may obtain a question classified as an incorrect answer question among at least one question stored in the memory 120 and control the display 130 to display the obtained question.

Specifically, when the user command for displaying the incorrect answer note is input, the incorrect answer note providing module 240 may obtain a question processed as an incorrect answer question among at least one question stored in the memory 120 and display on the display 130 according to the acquired order. However, one or more embodiments are not limited thereto, and the incorrect answer note providing module 240 may display a question classified as a confirmation question among at least one question stored in the memory 120 on the display 130. That is, the incorrect answer note providing module 240 may classify and provide a question according to scoring information identified in a plurality of questions stored in the memory 120.

Furthermore, the processor 140 may control the display 130 to display a question processed as an incorrect answer question in the order in which the question processed as the incorrect answer question is stored in the memory 120. However, one or more embodiments are not limited thereto, and an incorrect answer question may be displayed for each date the incorrect answer question is acquired, or an incorrect answer question may be displayed for each type of question, and various embodiments of a UI that displays an incorrect answer question through an incorrect answer note will be described in detail later.

The similar question providing module 250 may provide a similar question to at least one question stored in the memory 120.

The similar question providing module 250 to control the display 130 to display, as a similar question, at least one of a plurality of questions pre-stored in the memory 120 whose similarity to the question selected by the user is greater than or equal to a preset value (for example, greater than or equal to 80). That is, based on the similarity identified by the question classification module 230, the similar question providing module 250 may provide a similar question to a question selected by a user among the plurality of questions pre-stored in the memory 120.

As an example, the similar question providing module 250 may obtain a similar question based on at least one question included in the representative type in which the question selected by the user is classified and control the display 130 to display the obtained similar question.

As another example, when a user command for displaying a similar question to at least one of the questions displayed in the incorrect answer note is input, while an incorrect answer note is displayed on the display 130, the similar question providing module 250 may obtain and display at least one similar question for the corresponding question on the display 130.

The hint providing module 260 may provide a hint for a question selected by a user. By way of example, hint information on each question belonging to respective representative type may be stored in the memory 120. For example, first hint information on the first representative type may be stored in the memory 120. Further, the hint providing module 260 may provide a hint for a question selected by a user according to hint information corresponding to a representative type to which a question belongs.

The hint providing module 260 may provide hint information according to a user's achievement level for a question selected by a user. That is, a hint scenario in which a plurality of hint information is combined for each representative type is stored in the memory 120, and the hint providing module 260 may provide hint information suitable for the user's achievement level among hint scenarios for each representative type corresponding to the question. For example, when the user's achievement level for the representative type to which the question selected by the user belongs is identified as high (for example, a fifth stage), the hint providing module 260 may provide indirect hint information with low hint strength among the hint scenarios of the corresponding representative type. In addition, when the user's achievement level for the representative type for the question to which the hint is to be provided is identified as low (for example, a second stage), the hint providing module 260 may provide direct hint information with a higher hint intensity (or quality) among the hint scenarios of the corresponding representative type. Here, the hint intensity or quality may indicate a level of hint that may be provided to a user in order to solve a question. For example, the higher the hint intensity, more ascertainable or easier for the user to look at the hint and solve the question.

Furthermore, when the question identified by the question identification module 210 is classified as a new representative type through the question classification module 230, the hint providing module 260 may generate a new hint scenario corresponding to the new representative type. For example, a new hint scenario corresponding to a new representative type may be generated based on the hint scenario for each representative type pre-stored in the memory 120, and a detailed method for creating a new hint scenario will be described in detail later.

As describe above, the processor 140 may identify a question and classify the question identified by the question according to the scoring information, and provide an incorrect answer note function according to the scoring information corresponding to the identified question. In addition, by classifying the question identified by a representative type, a similar question and a hint corresponding to the identified question may be provided.

On the other hand, it has been described that the question identification model and the similarity model are separately configured in the question identification module 210 and the question classification module 230, but one or more embodiments are not limited thereto, and the question identification model and the similarity model may be included in the question identification module 210 and/or the question classification module 230.

FIG. 2A is a diagram illustrating a method for identifying a question included in an image according to an embodiment.

According to an embodiment, the question identification module may identify text information, figure information, and equation information in the question paragraph identified in the image. Specifically, referring to FIG. 2A, the question identification module may identify the text information of a mathematical question including text such as "There is a rectangle having a circumference length of 40 cm and an area of 96 cm². Obtain a horizontal length. (However, the horizontal length is longer than a vertical length.)" The text information may include a combination of words, phrases, numbers, symbols, punctuations, clauses, etc., and the text information may be parsed in units of words. FIG. 2A illustrates only the case where the mathematical question includes only text, but the question is not limited thereto. That is, the mathematical question may further include a figure, and the question identification module can identify figure information by obtaining a rough frame of the figure in the captured or photographed image. In addition, when the mathematical question further includes an equation, the question identification module may identify equation information on which equation (for example, quadratic equation) by transforming the equation into latex.

Figure 2B:
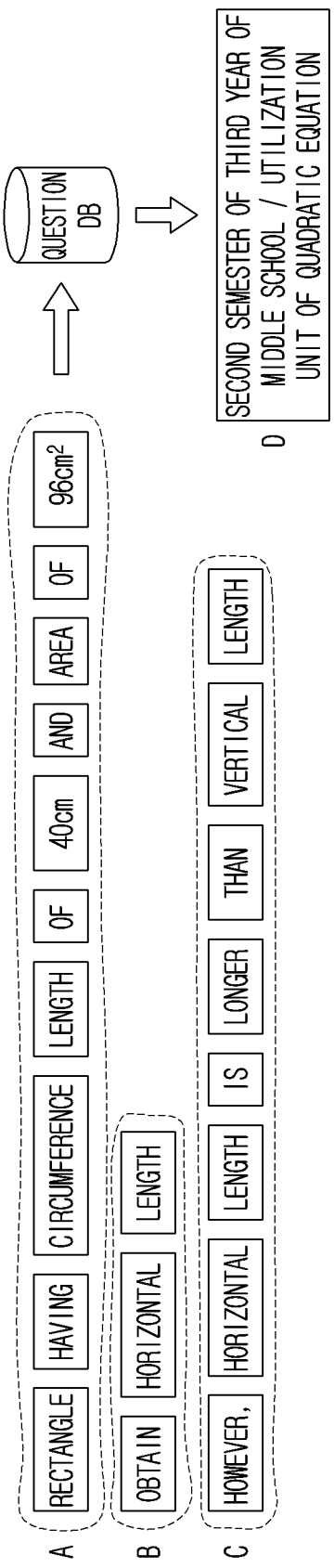
FIG. 2B is a diagram illustrating a method for identifying a question through text information of a question according to an embodiment.

FIG. 2B is a diagram illustrating a method for identifying a question through text information of a question according to an embodiment.

The question identification module may identify condition information and target information on a mathematical question based on text information identified in the mathematical question. Referring to FIG. 2B, the question identification module may use a plurality of pieces of text information on tag A among a plurality of pieces of text information on the mathematical question to identify the first condition information on the mathematical question as "((circumference length=40 cm) and (area=96 cm²)=rectangle)", and identify the first condition information as the tag A.

In addition, the question identification module may use a plurality of pieces of text information on tag C among the plurality of pieces of text information on the mathematical question to identify the second condition information on the mathematical question as "(horizontal length>vertical length)" and identify the second condition information as the tag C.

Furthermore, the question identification module may use a plurality of pieces of text information on tag B among the plurality of pieces of text information on the mathematical question to identify the target information on the mathematical question as "(horizontal length)" and identify the target information as the tag B.

In addition, the question identification module may identify unit information on the corresponding question based on the identified target information and condition information, and identify the identified unit information as tag D. The unit information may be information on a unit to which the identified question belongs, and the unit information may be classified for each unit included in a curriculum by grade. Table 1 is a table showing units of a mathematics curriculum for a middle school in Korea.

TABLE 1

| First year of middle school | Second year of middle school | Third year of middle school |
|---|---|---|
| Prime factorization | Rational number and decimal | Real number and calculation |
| Integer and rational number | Calculation of equation | Character and equation |
| Character and equation | Simultaneous equation | Quadratic equation and graph |
| Function and graph | Linear inequality and simultaneous linear inequality | Utilization of quadratic equation |
| Statistics | Linear function and graph | Statistics |
| Construction of basic figure and triangle | Number of cases and probability | Pythagorean theorem |
| Property of planar figure | Property of triangle and square | Trigonometric ratio |
| Property of three-dimensional figure | Similarity and utilization of figure | Property of circle |

Referring to FIG. 2B, the question identification module may identify the question identified based on the tags A, B, and C as a utilization unit of a quadratic equation of a second semester of third year of middle school, and identify the identified unit as the tag D. Through the above-described process of the electronic device 100, the question identification module may identify that the corresponding mathematical question is a question type for tags A, B, C, and D.

Figure 2C:
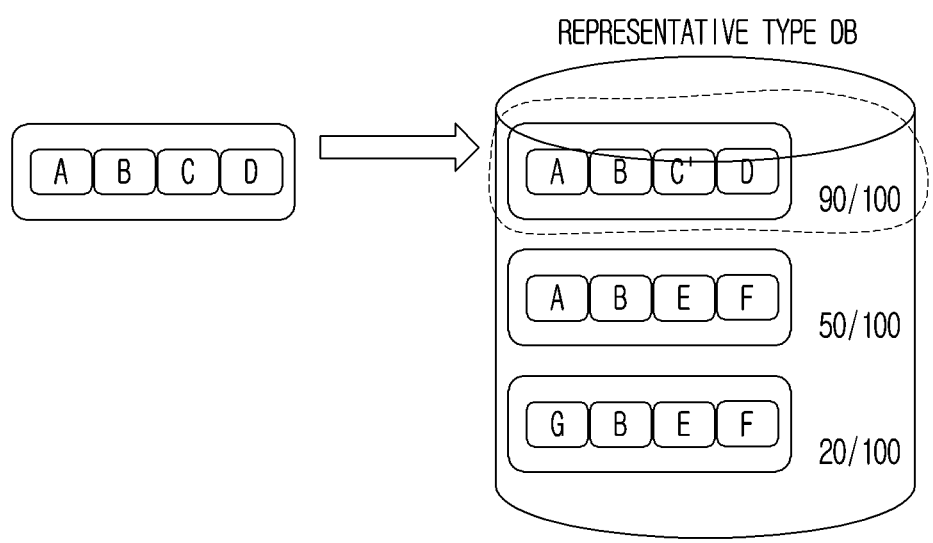
FIG. 2C is a diagram illustrating a method for classifying a question identified by a question identification module by type according to an embodiment.

FIG. 2C is a diagram illustrating a method for classifying a question identified by a question identification module by type according to an embodiment.

The question classification module may classify the question identified by the question identification module by type. That is, when the mathematical question illustrated in FIG. 2A is identified as being a question type for the tags A, B, C, and D by the question identification module, the question classification module may further identify a representative type for the mathematical question based on the tags. According to an embodiment, the question classification module may identify the similarity between the plurality of questions (representative type DB) pre-stored in the memory 120 of the electronic device 100 or in an external server based on the similarity model and the question identified by the question identification module. As an example, the similarity may be represented in the range of 1 to 100, and if a value indicating a similarity is high, the question may be identified as one of the representative types stored in the memory. The similarity model may be a model using a term frequency-inverse document frequency (TF-IDF) technique and a plus minus interest (PMI) technique, and/or may be an artificial intelligence model using a deep learning technique such as long short-term memory models (LSTM).

The similarity model according to an embodiment may identify the similarity between the question identified by the question identification module based on a frequency of a tag used in the question, an order of tags in the question, and a combination of tags, and the like. That is, based on the tags of the question identified according to the above examples by the question identification module, the similarity model may determine the similarity between the question and one of the plurality of questions (question types included in the representative type DB) pre-stored in the memory of the electronic device 100 or the external server.

Referring to FIG. 2C, the question identification module may identify, as a representative type of a mathematical question illustrated in FIG. 2A. For example, the question types for tags A, B, C', and D with the highest similarity of 90 may be identified as a question type for tags A, B, C, and D of the question, among the representative types DBs. However, one or more embodiments are not limited thereto, and when the question identified by the question identification module has a similarity to each of the plurality of representative types pre-stored in the representative type DB which is less than or equal to a preset value (for example, 50 or less), the question classification module may identify the question identified by the question identification module as a new type, and classify the question as a new representative type.

Figure 2D:
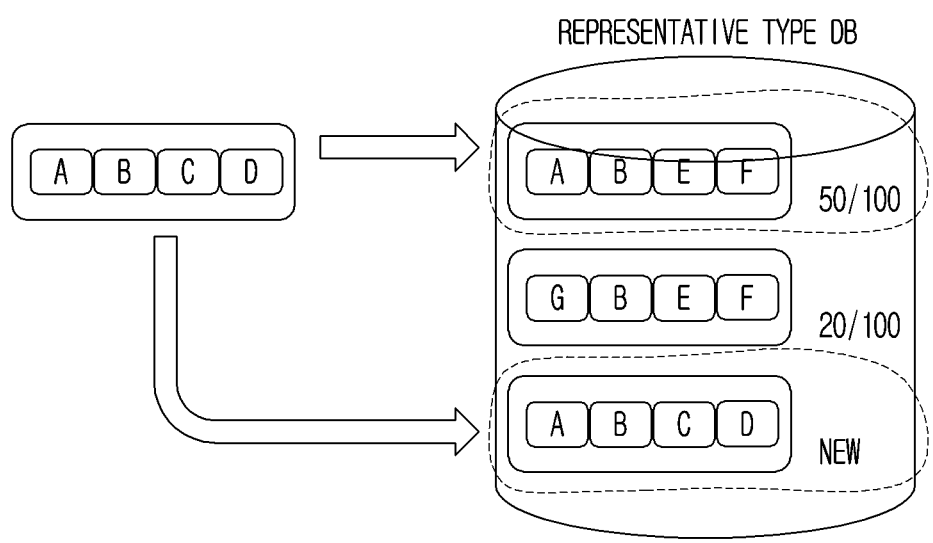
FIG. 2D is a diagram illustrating a method for classifying a question identified by a question identification module as a new representative type according to an embodiment.

FIG. 2D is a diagram illustrating a method for classifying a question identified by a question identification module as a new representative type according to an embodiment.

When the question identified by the question identification module has a similarity to each of the plurality of representative types pre-stored in the representative type DB which is less than or equal to a preset value (for example, 50 or less), the question classification module may classify the question identified by the question identification module as a new type. Specifically, referring to FIG. 2D, when the similarity to the question type (tags A, B, E, and F) having the highest similarity to the question type for tags A, B, C, and D among representative type DBs is 50, the question classification module can classify the question types for the tags A, B, C, and D as a new representative type.

Figure 3:
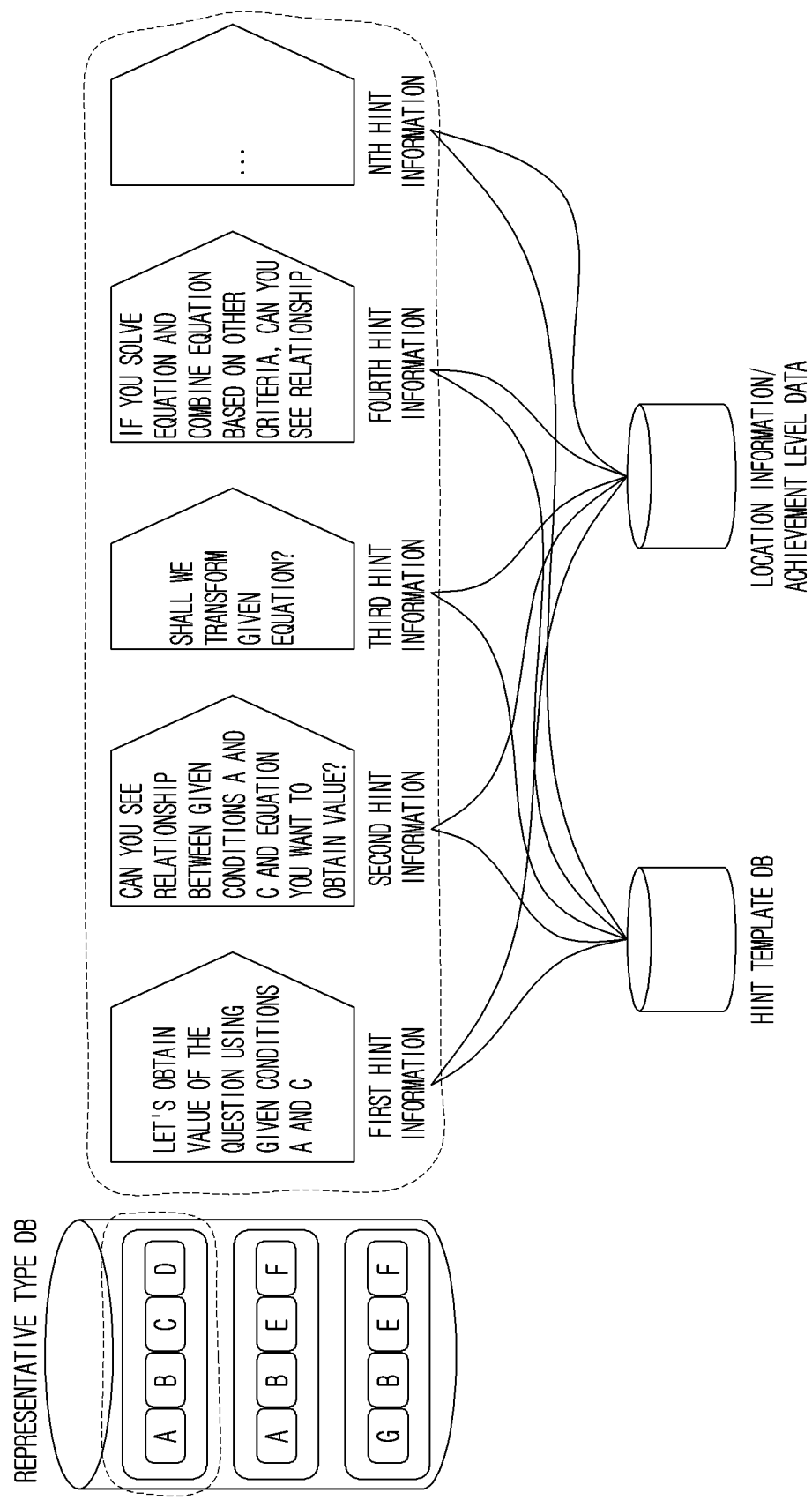
FIG. 3 is a diagram illustrating a method for providing a hint for a question according to an embodiment.

FIG. 3 is a diagram illustrating a method for providing a hint for a question according to an embodiment.

According to an embodiment, the hint providing module may provide a hint for a question. FIG. 3 is an exemplary embodiment in which the question identified by the question identification module is classified as one of the representative types pre-stored in the representative type DB.

According to an embodiment, each representative type stored in the representative type DB may include a hint scenario in which a plurality of hint information is combined. Here, a plurality of pieces of hint information may be extracted from a hint template DB.

Referring to FIG. 3, a hint scenario for the representative types for tags A, B, C, D is shown, and the hint scenario may include first hint information ("obtain a value of the question using the given conditions A and C), second hint information ("Can you see the relationship between the given conditions A and C and the equation you want to obtain?"), third hint information ("Shall we transform the given equation?"), and fourth hint information ("If you solve the equation and combine the equation based on other criteria, can you see the relationship"), and the like.

Furthermore, the hint providing module may provide hint information suitable for a user's achievement level based on a hint scenario for each representative type. Specifically, the hint providing module may provide hint information suitable for user's achievement based on information and achievement data of a user among a plurality of hint scenarios for each representative type.

For example, the first hint information included in the hint scenario may be indirect hint information having the lowest hint intensity, and the fourth hint information may be hint information having a higher hint intensity than the third hint information. When the user's achievement level for the representative type to which the question identified by the question identification module belongs is high (for example, a fifth stage), the hint providing module may provide the first hint information with low hint intensity among the hint scenarios of the corresponding representative type. Alternatively, when the user's achievement level for the representative type for the question to which the hint is to be provided is low (for example, a second stage), the hint providing module may provide direct third hint information among the hint scenarios of the corresponding representative type.

Figure 4A:
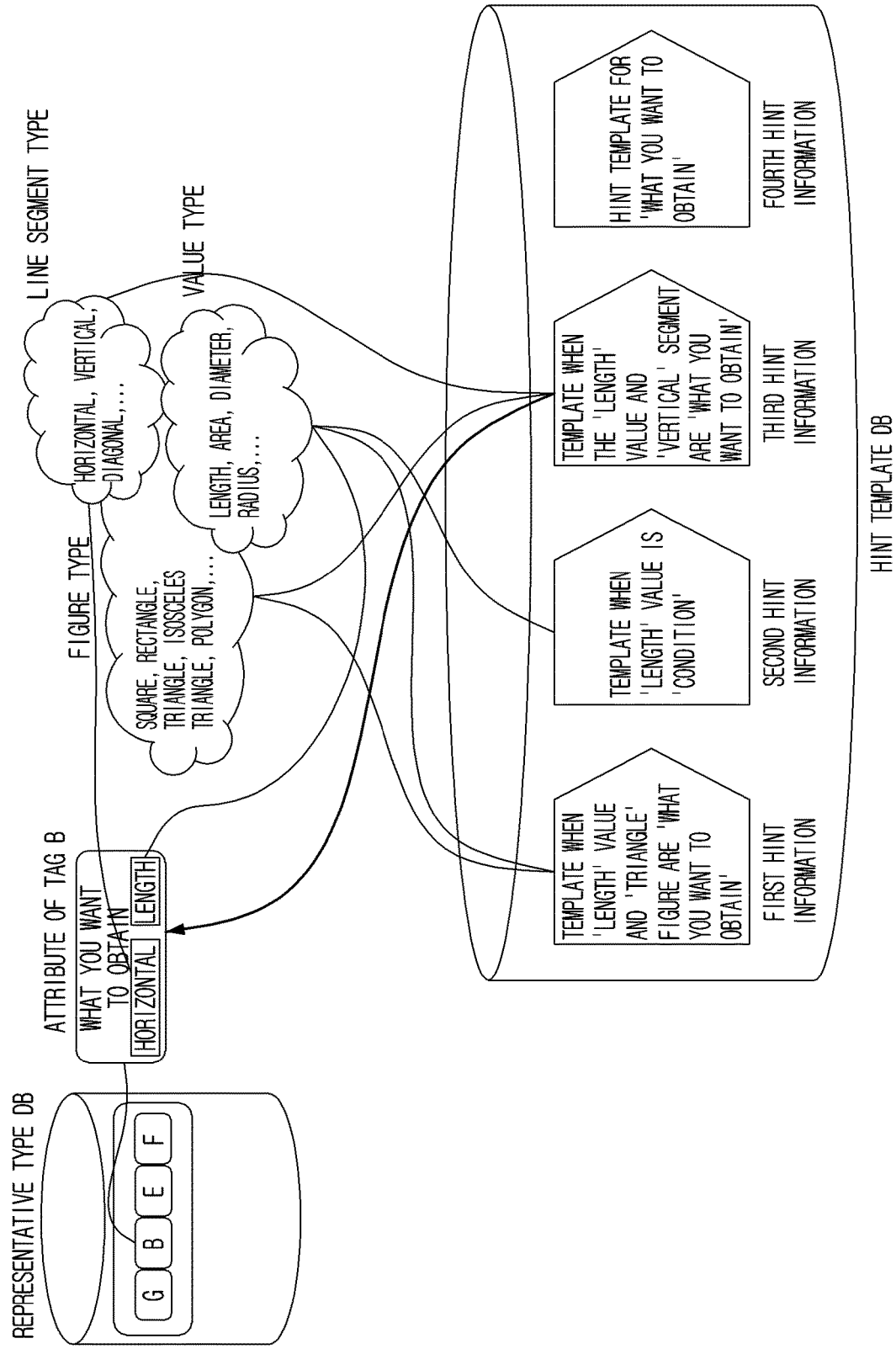
FIG. 4A is a diagram illustrating a method for providing a hint for a question of a new representative type according to an embodiment.

FIG. 4A is a diagram illustrating a method for providing a hint for a question of a new representative type according to an embodiment.

As an example, when the question identified by the question identification module is classified as a new representative type, the hint providing module may generate a hint scenario for the new representative type. As illustrated in FIG. 4A, when the representative type classified as the new representative type includes tags G, B, E, and F, the hint providing module may generate hint scenarios for the tags G, B, E, and F based on the hint information on each tag that is pre-stored. For example, the tag B may be a tag for target information of the corresponding question. Specifically, when the tag B is a tag for target information for "to obtain the area", the hint providing module may identify hint information that has a high relevance with the tag B among a plurality of pieces of hint information included in the hint template DB and identify the identified hint information as the hint information on the question having the tags G, B, E, and F.

Referring to FIG. 4A, the first hint information included in the hint template DB may be hint information on "when a length value and a triangle figure are to be obtained", the second hint information may be hint information on "when a length value is a condition", the third hint information may be hint information on "when a length value and a vertical line segment are to be obtained", and the fourth hint information may be hint information on the "what you want to obtain". In addition, the hint providing module may identify the third hint information among the first to fourth hint information as hint information having a high relevance to the tag B.

According to an embodiment, the fourth hint information, which is hint information on "what to seek", may have a wider condition range than the first hint information and the third hint information. That is, when the tag C is a tag for the target information on "to obtain the area", the hint providing module may identify that the first hint information and the third hint information do not match the condition of the tag B, and the fourth hint information may be identified as hint information having a high relevance with the tag B.

The hint providing module may identify hint information having a high relevance to each tag based on the above-described process for each tag for a new representative type to acquire a hint scenario including a plurality of identified hint information.

Figure 4B:
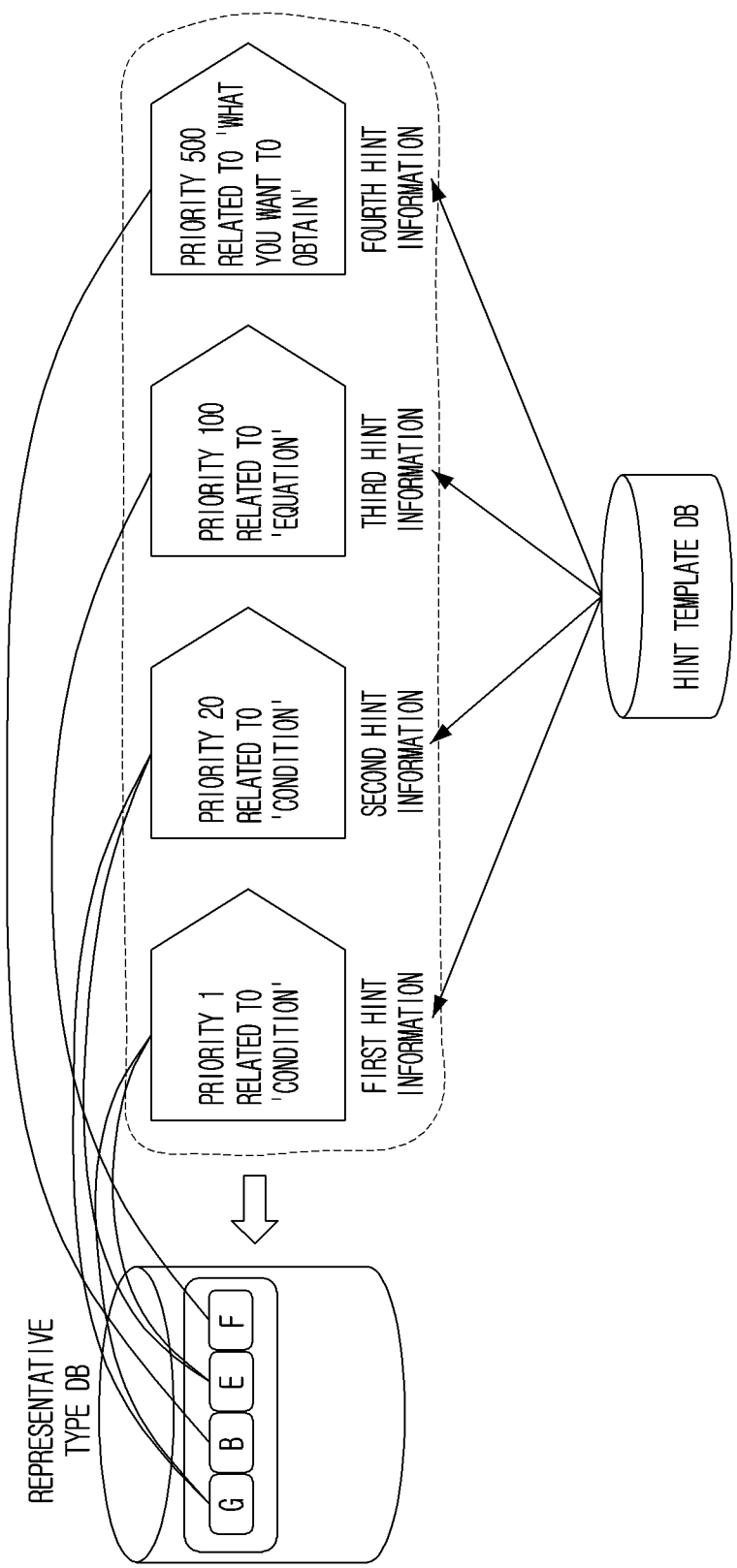
FIG. 4B is a diagram for describing a hint scenario for a new representative type according to an embodiment.

FIG. 4 is a diagram for describing a hint scenario for a new representative type according to an embodiment, Referring to FIG. 4B, the hint providing module may acquire hint information having a high relevance with each tag for a representative type, and then may acquire a hint scenario by determining an order of the acquired hint information by priority. Here, a representative type classified as a new representative type may include the tags G, B, E, and F. The tag G and the tag E are tags for condition information of the corresponding representative type, and the tag B may be a tag for the target information. The tag F may be a tag for equation information. In addition, the hint providing module may identify the hint information having a high relevance with the tag G and the tag E related to the condition information as hint information having high priority, identify the hint information with a high relevance with the tag B for the target information as hint information having a lower priority, and generate the hint scenario for the representative type including the tags G, B, E, and F in the order of the identified priority. That is, the hint information related to the condition information may be indirect hint information having a low hint intensity, and the hint information related to the target information may be direct hint information having a high hint intensity.

In addition, the hint providing module may provide hint information suitable for a user's achievement level in the hint scenario for the representative type including the tags G, B, E, and F. For example, when the user has achievement level 1 for the representative type including the tags of G, B, E, and F, the hint providing module may provide hint information related to target information with a high hint intensity and low priority in the hint scenario. Alternatively, when the user has achievement level 5 for the representative type including the tags of G, B, E, and F, the hint providing module may provide hint information related to condition information with a low hint intensity and high priority in the hint scenario.

Figure 5A:
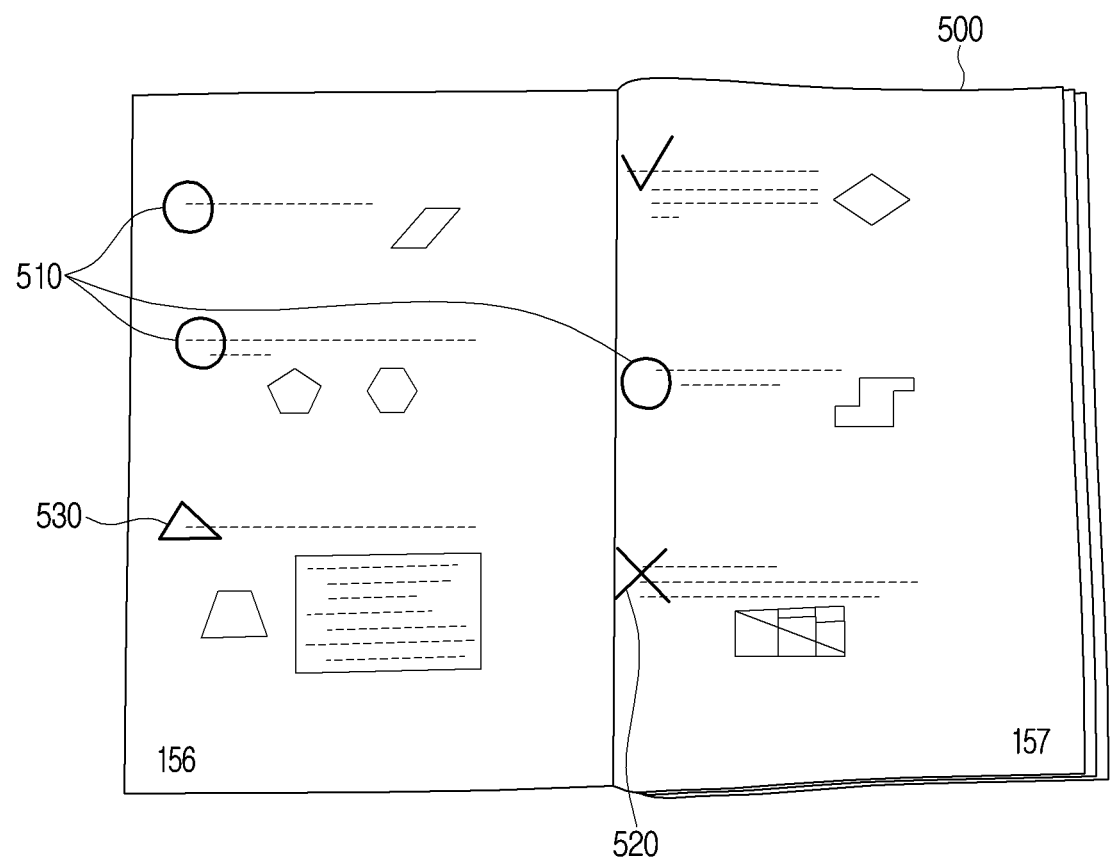
FIG. 5A is a diagram illustrating an exercise book in which scoring information is displayed by a user according to an embodiment.

FIG. 5A is a diagram illustrating an exercise book in which scoring information is displayed by a user according to an embodiment.

Referring to FIG. 5A, scoring information may be displayed with respect to each question included in an exercise book 500.

According to an exemplary embodiment, at least one question included in the exercise book 500 may be scored by a user. That is, a user may mark symbols such as circles, triangles, and 'X' marks on each number corresponding to each question with a pen or pencil to perform scoring. For example, when the user's answer to the question is a correct answer, the questions with the correct answers may be scored with a circle symbol 510. Here, the symbol 510 is illustrated as having a circle shape, and it is described that the symbol is drawn on a number corresponding to each question. However, one or more embodiments are not limited thereto, and the symbol may include any other shapes and does not necessarily have to be drawn on the number corresponding to each question. In addition, in a case where a question needs to be confirmed, a number corresponding to a question may be indicated with at least one of a check, an asterisk or a triangle symbol. In FIG. 5A, for example, a confirmation question is indicated with a triangular symbol 530.

When the question that needs to be confirmed may be a question that the user has answered correctly, but is not sure how to solve the question and/or recognized as an important question by the user, the question may be classified as a confirmation question. However, the confirmation question is not limited thereto, and may be set according to the user's need.

In addition, when a user's answer to a question is an incorrect answer, the number of the question may be scored with at least one of symbols, such as a hatching symbol and/or an "X" symbol. That is, the scoring information may be information on a symbol image displayed on at least one question by a user. In FIG. 5A, an incorrect answer question is indicated with an X symbol 520.

However, the symbols described above are not limited thereto, and the symbols for the correct answer question, the confirmation question, and the incorrect answer question may be set by a user. In addition, the scoring information identification module may perform learning using an AI model based on symbols captured in an image including at least one question to identify symbols corresponding to the correct answer question, the confirmation question, and the incorrect answer question that are associated with a user.

Figure 5B:
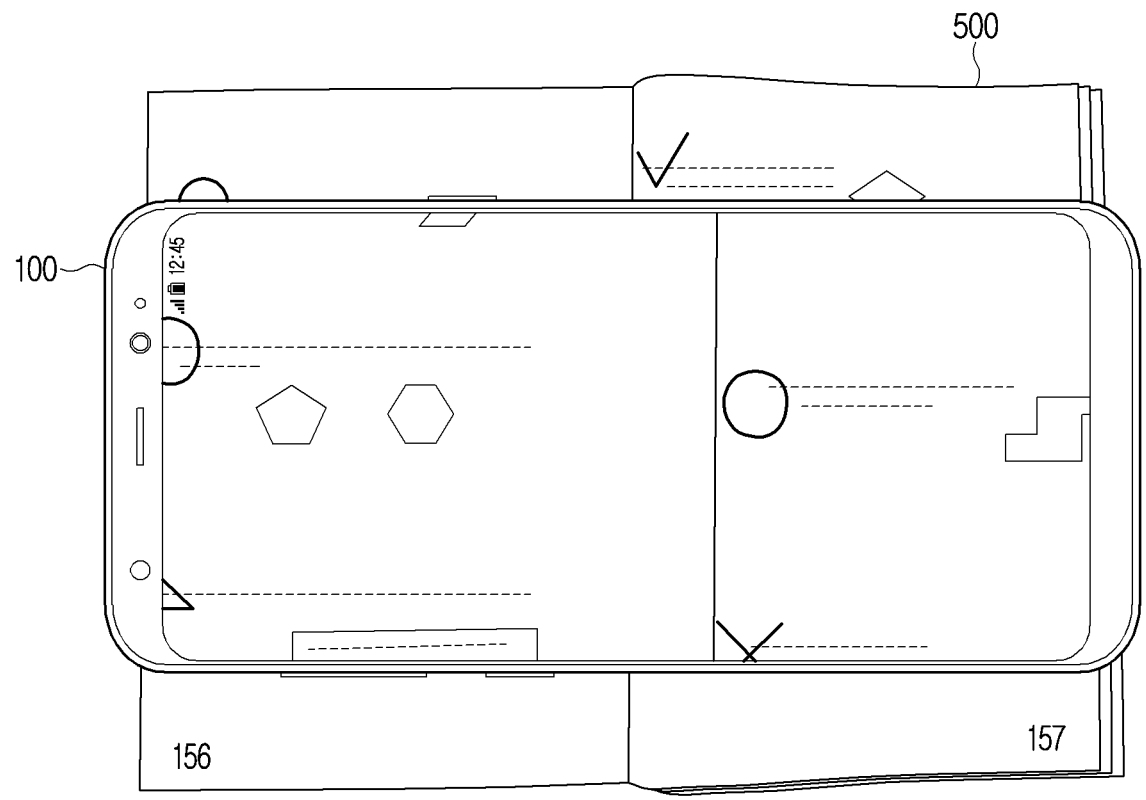
FIG. 5B is a diagram illustrating a method for photographing an exercise book through an electronic device according to an embodiment.

FIG. 5B is a diagram illustrating a method for photographing an exercise book through an electronic device according to the embodiment.

Referring to FIG. 5B, the electronic device 100 may acquire an image of the exercise book 500 by using the camera of the electronic device 100 and identify at least one question in the acquired image. Specifically, the question identification module may identify at least one paragraph (or a sentence, a phrase, a word) in the acquired image and identify the identified paragraph as one question.

However, the disclosure is not limited thereto. The electronic device 100 may be configured such that the camera of the electronic device 100 may photograph a part or an entire page of the exercise book 500. In an embodiment, it is possible to identify at least one question through an image of one of a plurality pages of the exercise book currently displayed on the display of the electronic device 100 without an input for photographing a separate image. That is, the electronic device 100 may identify at least one paragraph from an image currently displayed on the display through the camera function, and identify the identified paragraph as one question. A method for identifying at least one paragraph in an image currently displayed on the display will be described later with reference to FIGS. 6A, 6B, 7A, and 7B.

Figure 5C:
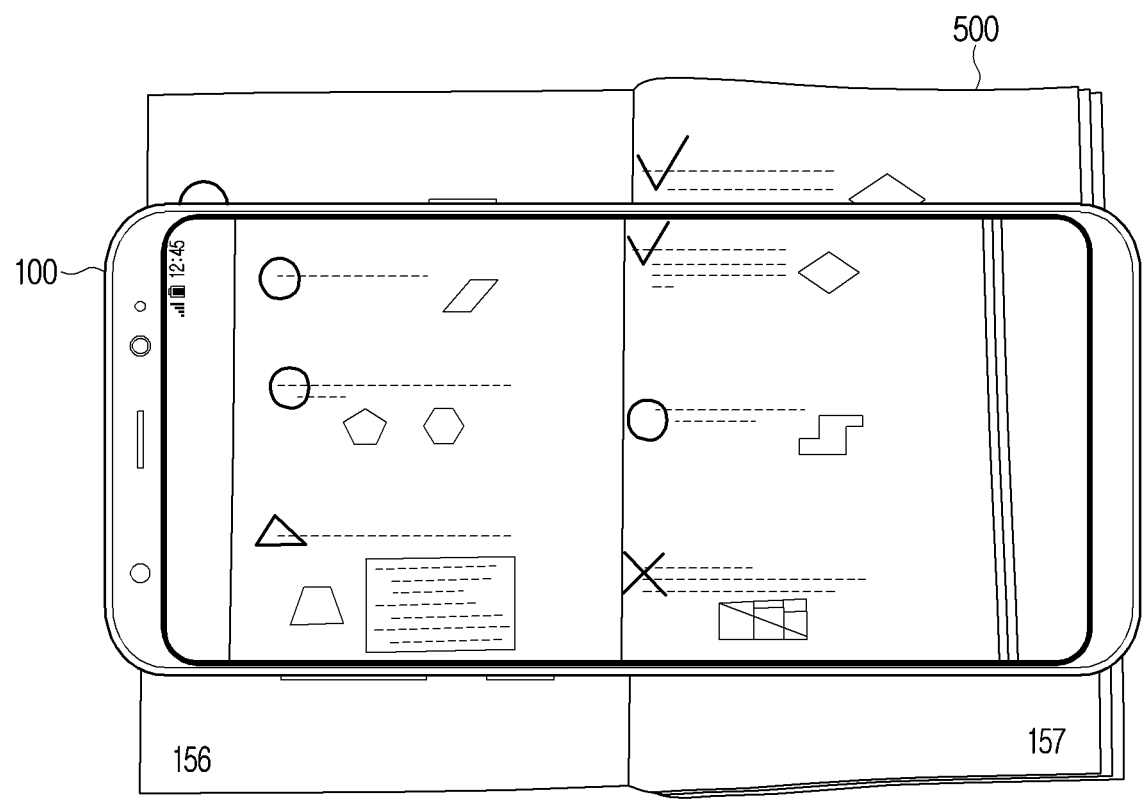
FIG. 5C is a diagram illustrating a method for photographing an overall region of an exercise book through an electronic device according to an embodiment.

FIG. 5C is a diagram illustrating a method for photographing an overall region of an exercise book through an electronic device according to the embodiment.

According to an embodiment, when the camera of the electronic device 100 photographs the exercise book 500, the electronic device 100 may switch a photographing mode of a camera to a wide-angle mode so that the entire area of the exercise book 500 is displayed on the display of the electronic device as illustrated in FIG. 5C. When the photographing mode of the camera is switched to the wide-angle mode and the entire exercise book 500 is displayed on the display of the electronic device 100, the electronic device 100 can identify all of the questions included in the corresponding page of the exercise book.

FIGS. 6A, 6B, 7A, and 7B are diagrams for describing the method for identifying one question in an image displayed on a display of an electronic device according to an embodiment.

Figure 6A:
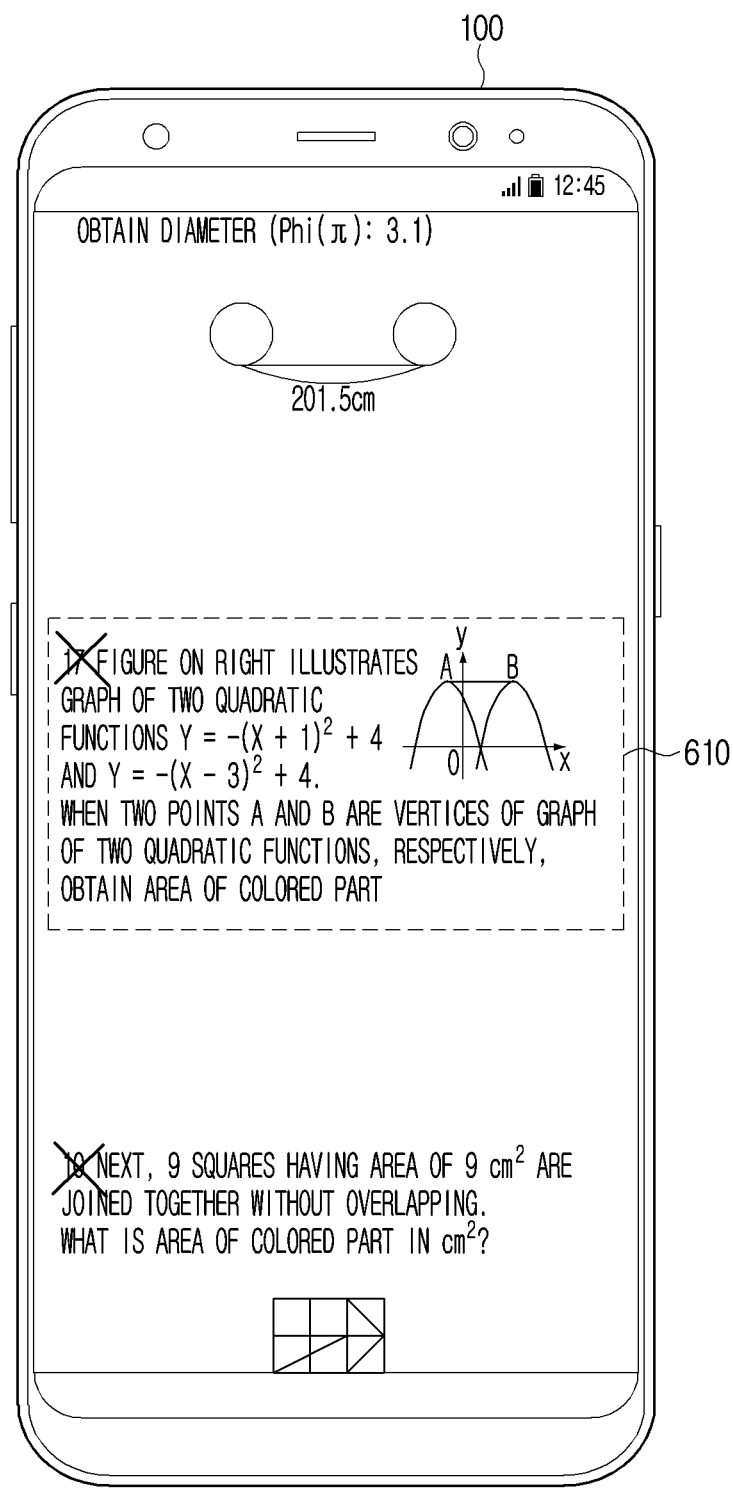
FIG. 6A is a diagram for describing a method for identifying one question in an image displayed on a display of an electronic device according to an embodiment.

The electronic device 100 may display an image on a display through the camera, and may identify a question from the image displayed on the display. For example, when three questions are displayed on the image displayed on the display as illustrated in FIG. 6A, the electronic device 100 may identify an area 610 that includes a question. Here, the area 610 may be the largest area among three question areas on a page of the exercise book 500.

Figure 6B:
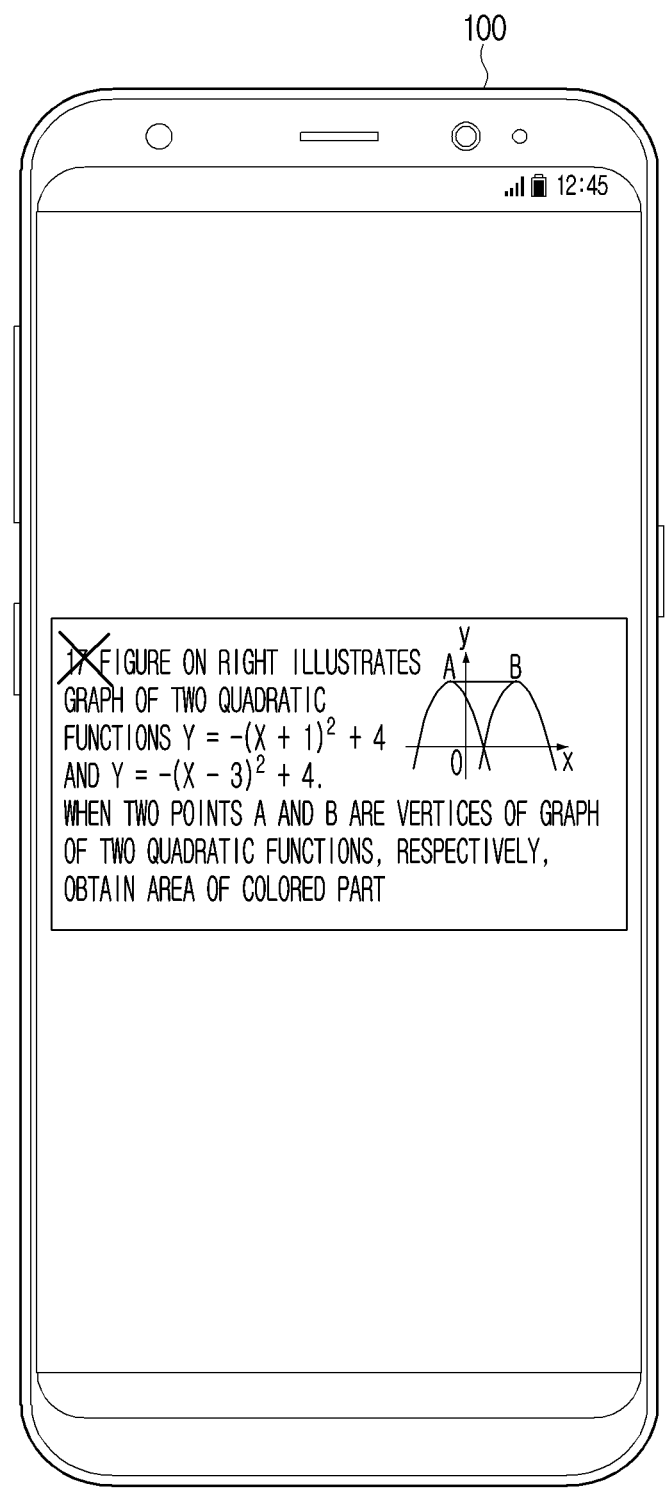
FIG. 6B is a diagram for describing a method for identifying one question in the image displayed on a display of an electronic device according to an embodiment.

That is, as illustrated in FIG. 6B, the electronic device 100 may identify a question corresponding to the area 610 in which the area displayed on the display is the largest among areas including at least one question displayed on the display.

Figure 7A:
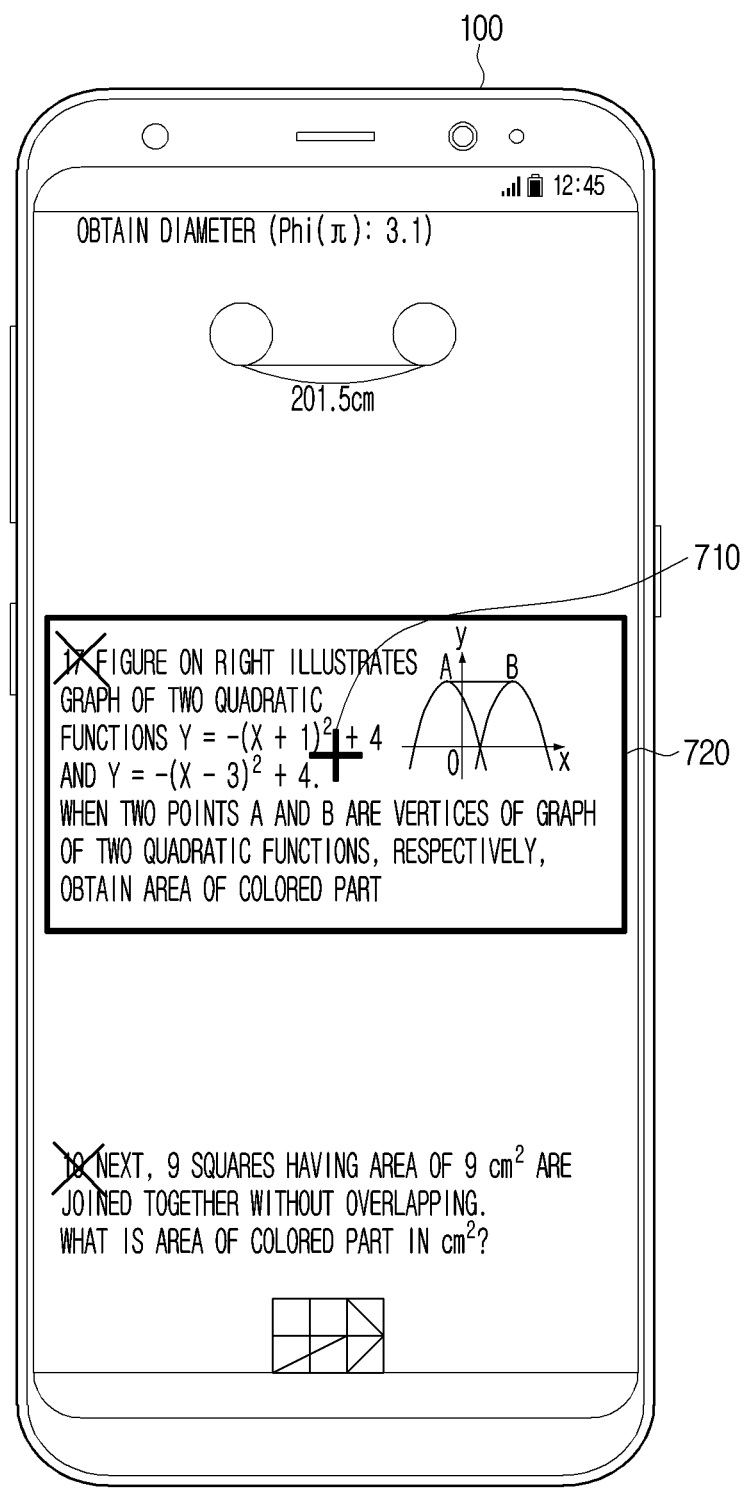
FIG. 7A is a diagram for describing a method for identifying one question in the image displayed on a display of an electronic device according to an embodiment.

According to an embodiment, the electronic device 100 may further display a first UI 710 (e.g., a center point) and a second UI 720 (e.g., a rectangular box) in the image displayed on the display to identify a question as illustrated in FIG. 7A.

Figure 7B:
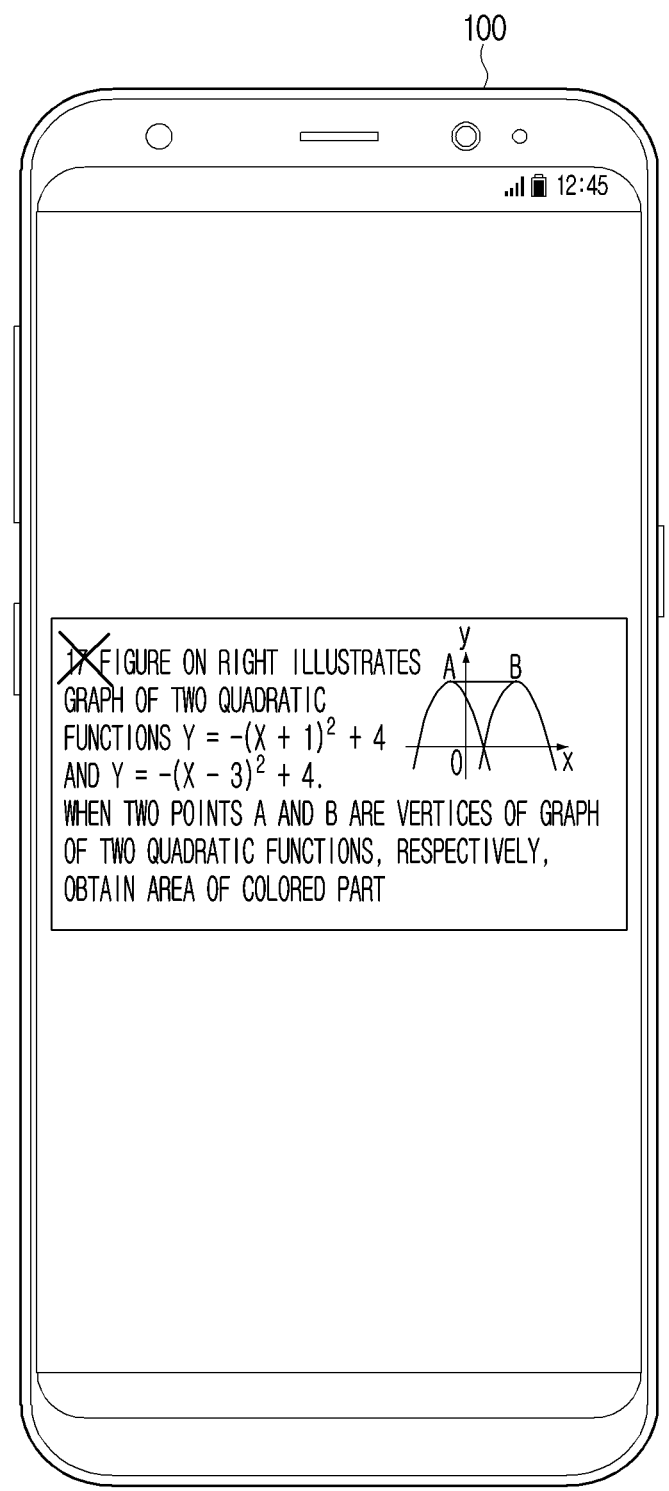
FIG. 7B is a diagram for describing a method for identifying one question in an image displayed on a display of an electronic device according to an embodiment.

In addition, the electronic device 100 may be configured to guide a user to move the camera of the electronic device 100 so that an area corresponding to one question is located in the UI 720. In addition, the electronic device 100 may identify a question displayed in the UI 720 as illustrated in FIG. 7B.

Figure 8A:
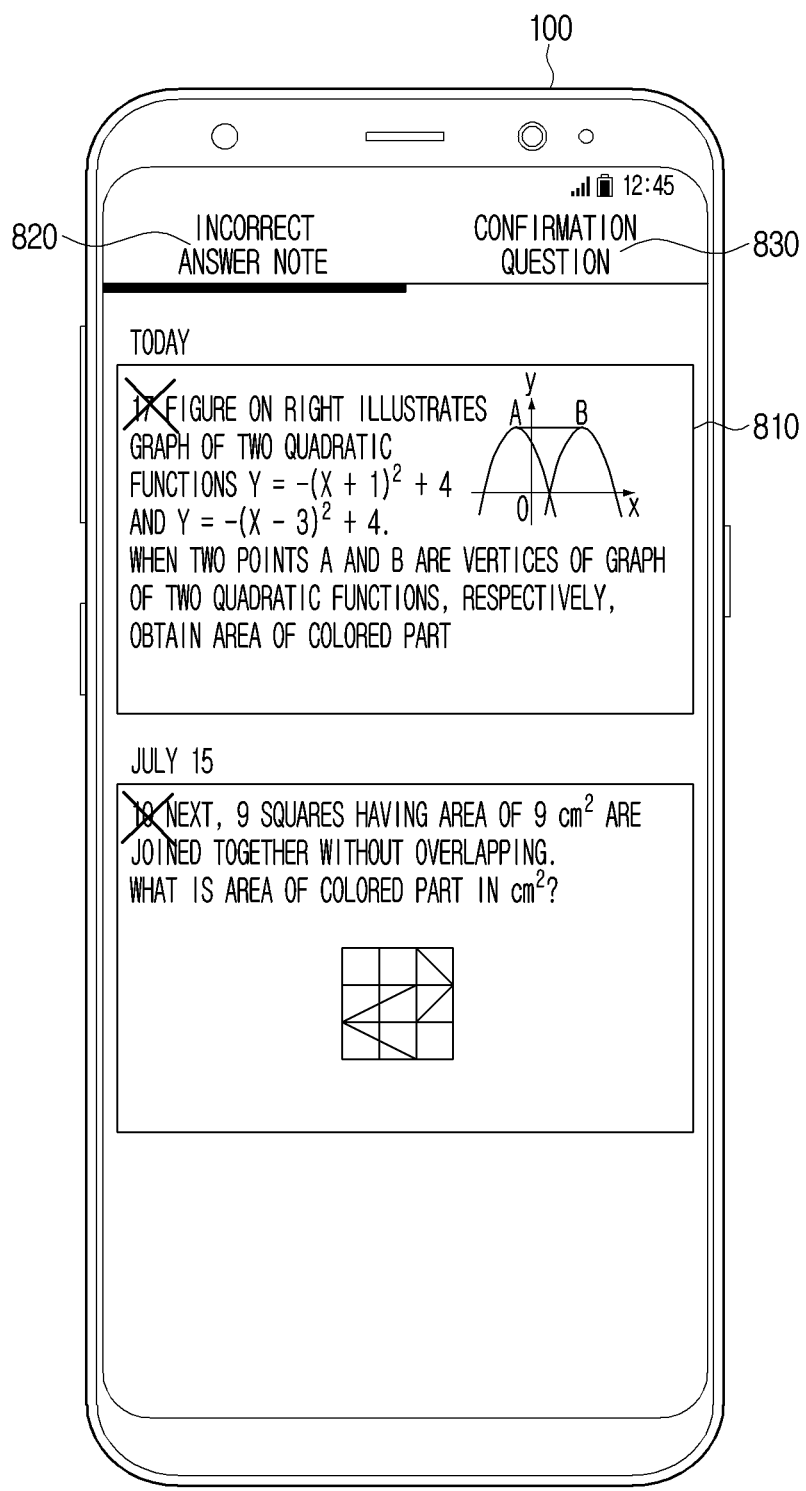
FIG. 8A is a diagram illustrating a UI for providing an incorrect answer note according to an embodiment.

FIG. 8A is a diagram illustrating a UI for providing an incorrect answer note according to an embodiment.

According to an embodiment, the electronic device 100 may identify the question in the exercise book according to the method described in FIGS. 5A to 7B. In addition, the electronic device 100 may identify the scoring information indicated or marked by the user from the question identified by the scoring information identification module 220 and classify the corresponding question into at least one from among the incorrect answer question, the correct answer question, and the confirmation question. In addition, the electronic device 100 may store the identified question in the memory according to the classified scoring information. However, one or more embodiments of the disclosure are not limited thereto, and the electronic device 100 may transmit the identified question and the classified scoring information to an external server, and store the identified question and the scoring information in the external server.

In addition, when a user command for displaying an incorrect answer note is input, the electronic device 100 may control the display to display a question classified as an incorrect answer question among a plurality of questions stored in the memory. Specifically, when an incorrect answer note icon 820 is selected while an application for learning assistant function is being executed, a question classified as an incorrect answer question may be displayed. In an embodiment, questions classified as the incorrect answer question may be displayed in a chronological order. Referring to FIG. 8A, at least one question 810 classified as the incorrect question today may be displayed first and another question classified as incorrect in the past (e.g., July 15) may be displayed next. However, one or more embodiments of the disclosure are not limited thereto, and the incorrect answer question may be displayed by question type. That is, the incorrect answer question may be displayed by a type of question identified by the question classification module. In addition, the order and method in which the incorrect answer questions are displayed may be set by a user.

Figure 8B:
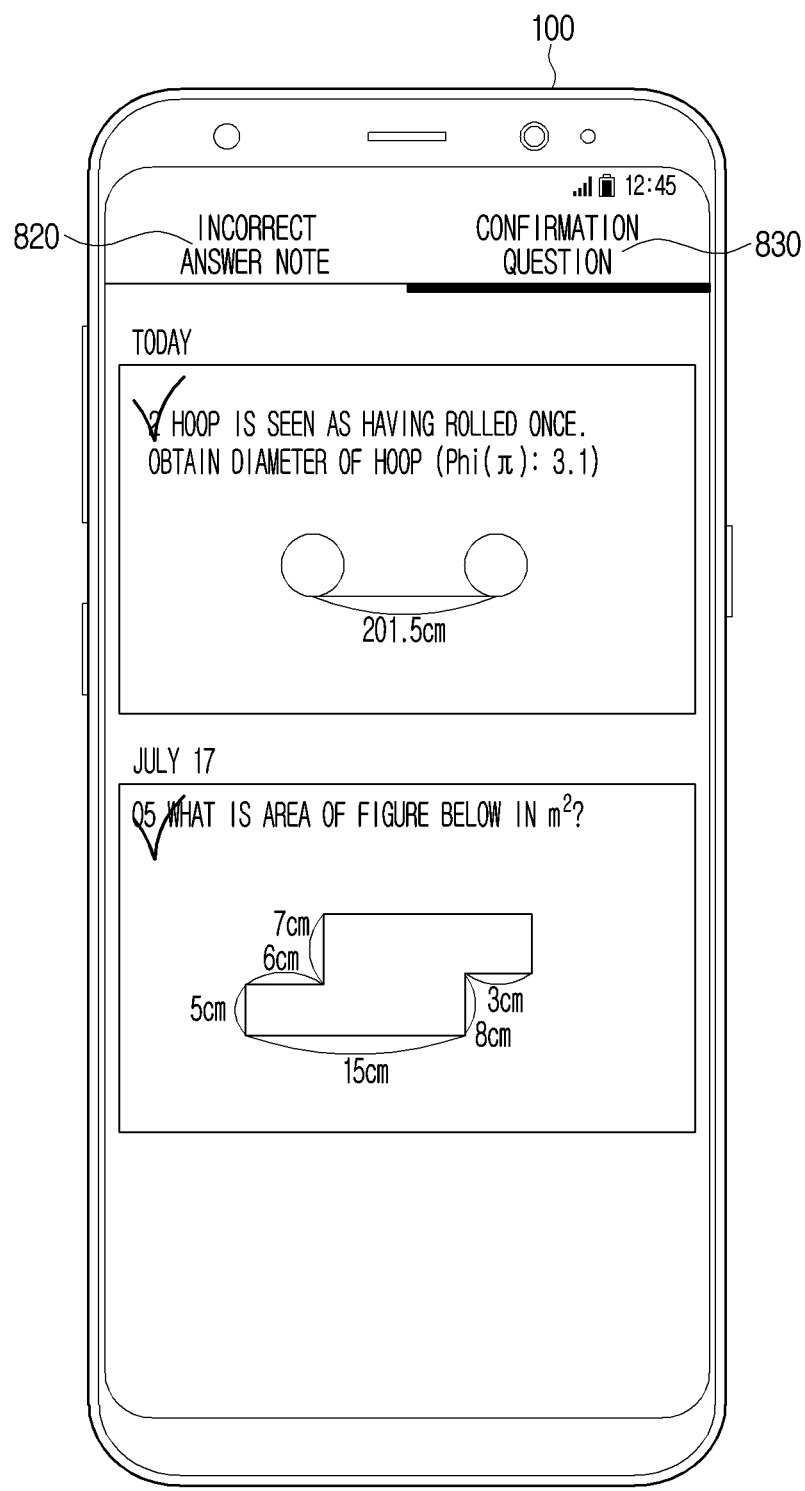
FIG. 8B is a diagram illustrating a UI for providing a confirmation question according to an embodiment.

FIG. 8B is a diagram illustrating a UI for providing an incorrect answer note according to an embodiment.

According to an embodiment, when a confirmation question icon 830 is selected while the application for learning assistant function is being executed, the electronic device 100 may display a question classified as a confirmation question. That is, questions classified as the confirmation question may be displayed in a chronological order. Referring to FIG. 8B, at least one question classified as the confirmation question today may be displayed first and another question classified as the confirmation in the past (e.g., July 17) may be displayed next. However, one or more embodiments of the disclosure are not limited thereto, and the confirmation question may be displayed by question type. That is, the electronic device 100 may display the confirmation question by type for the question identified by the question classification module. In addition, the order and method in which the incorrect answer questions are displayed may be set by a user.

FIGS. 9A to 9E are diagrams illustrating the UI for providing a hint according to the embodiment.

Figure 9A:
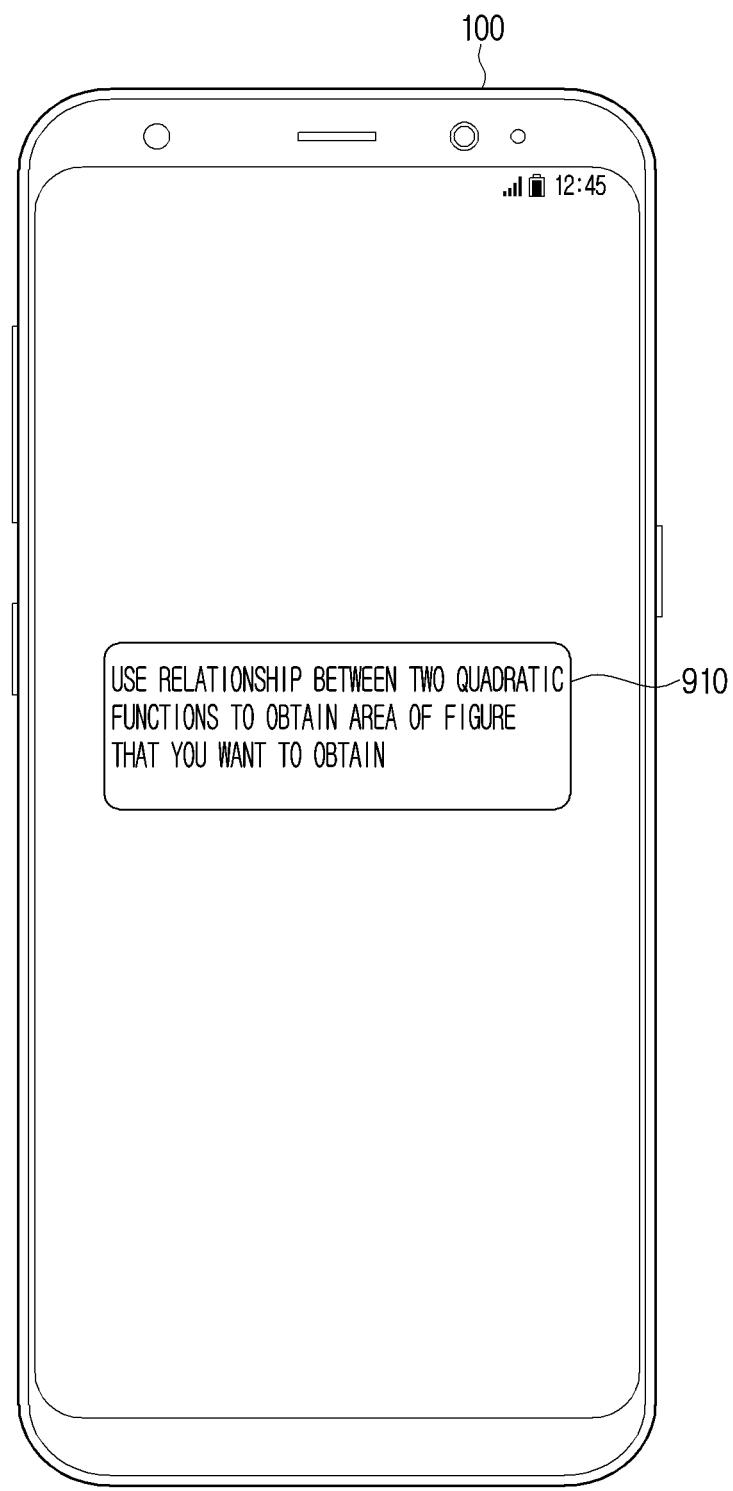
FIG. 9A is a diagram illustrating a UI for providing a hint according to an embodiment.
Figure 9B:
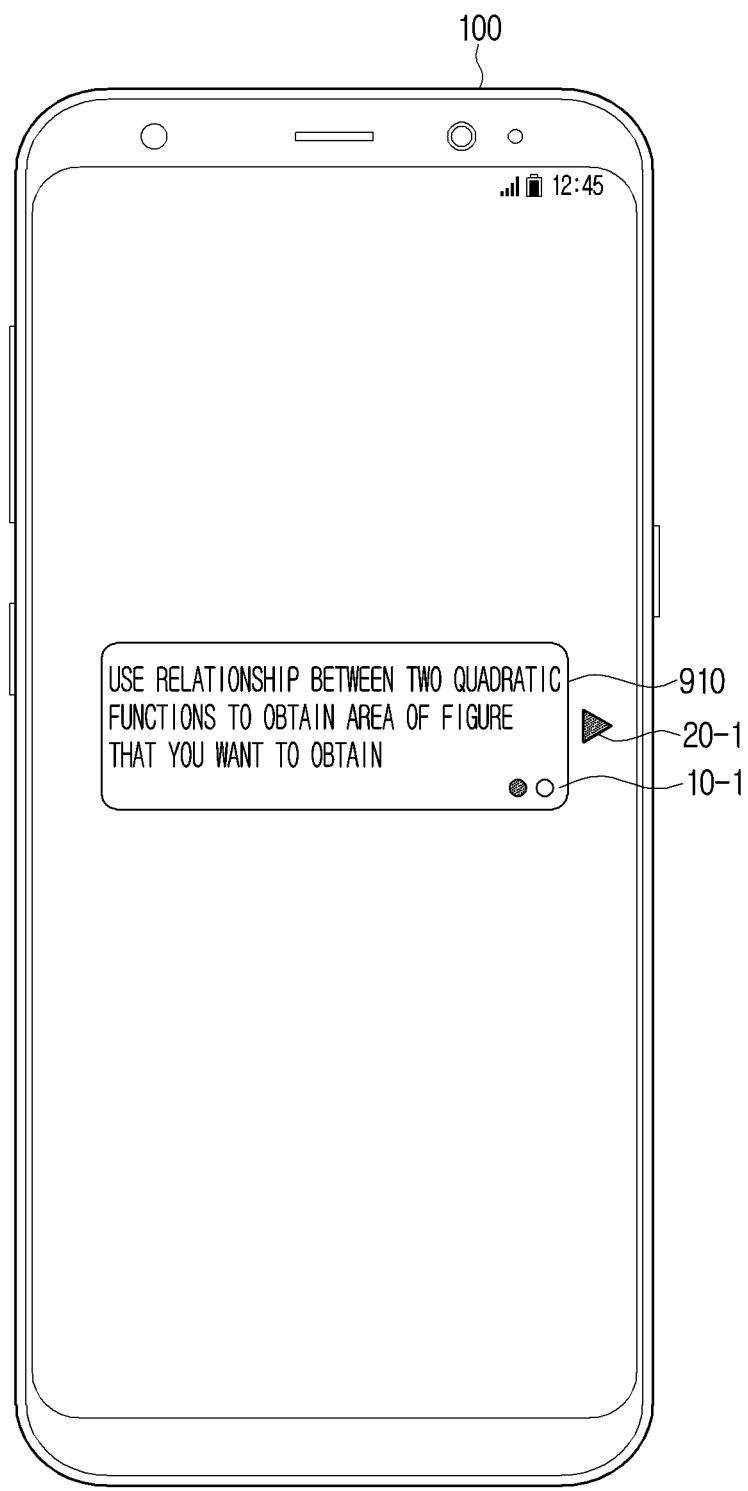
FIG. 9B is a diagram illustrating a UI for providing a hint according to an embodiment.

According to an embodiment, when one question is selected while the incorrect answer question is displayed on the display as illustrated in FIG. 8A, the electronic device 100 may provide hint information on the selected question. When the first question 810 is selected from the questions displayed in FIG. 8A, the electronic device 100 may display first hint information 910 with respect to the first question 810 on the display as illustrated in FIG. 9A. According to an embodiment, the first hint information 910 may be hint information reflecting a user's achievement level associated with the type of the first question 810. In other words, the hint information may vary according to the user's historical performance on the type of question associated with the first question 810.

According to an embodiment, when a preset time (for example, 3 seconds) elapses after the first hint information 910 of FIG. 9A is displayed, the electronic device 100 may display UIs 10-1 and 20-1 for providing second hint information 920 for the first question 810 together with the first hint information 910. That is, referring to FIG. 9B, an icon 10-1 representing the number of pieces of hint information and an icon 20-1 for displaying the next hint information may be displayed together with the first hint information 910.

Figure 9C:
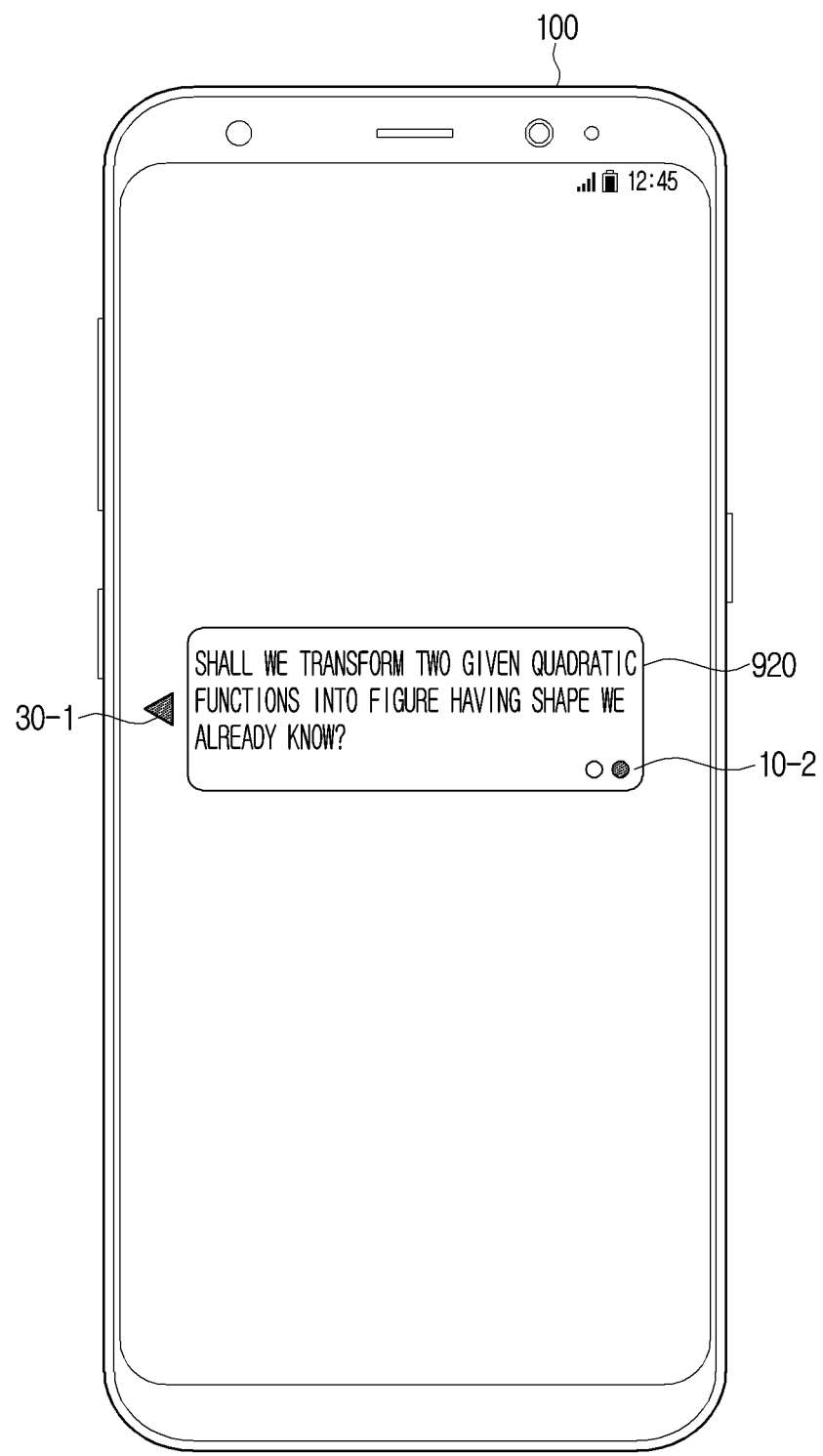
FIG. 9C is a diagram illustrating a UI for providing a hint according to an embodiment.

When the icon 20-1 for providing the next hint information is selected, the electronic device 100 may display the second hint information 920 as illustrated in FIG. 9C. In addition, the icon 10-2 for displaying the number of pieces of hint information and an icon 30-1 for displaying the previous hint information may be displayed on the display together with the second hint information 920.

Figure 9D:
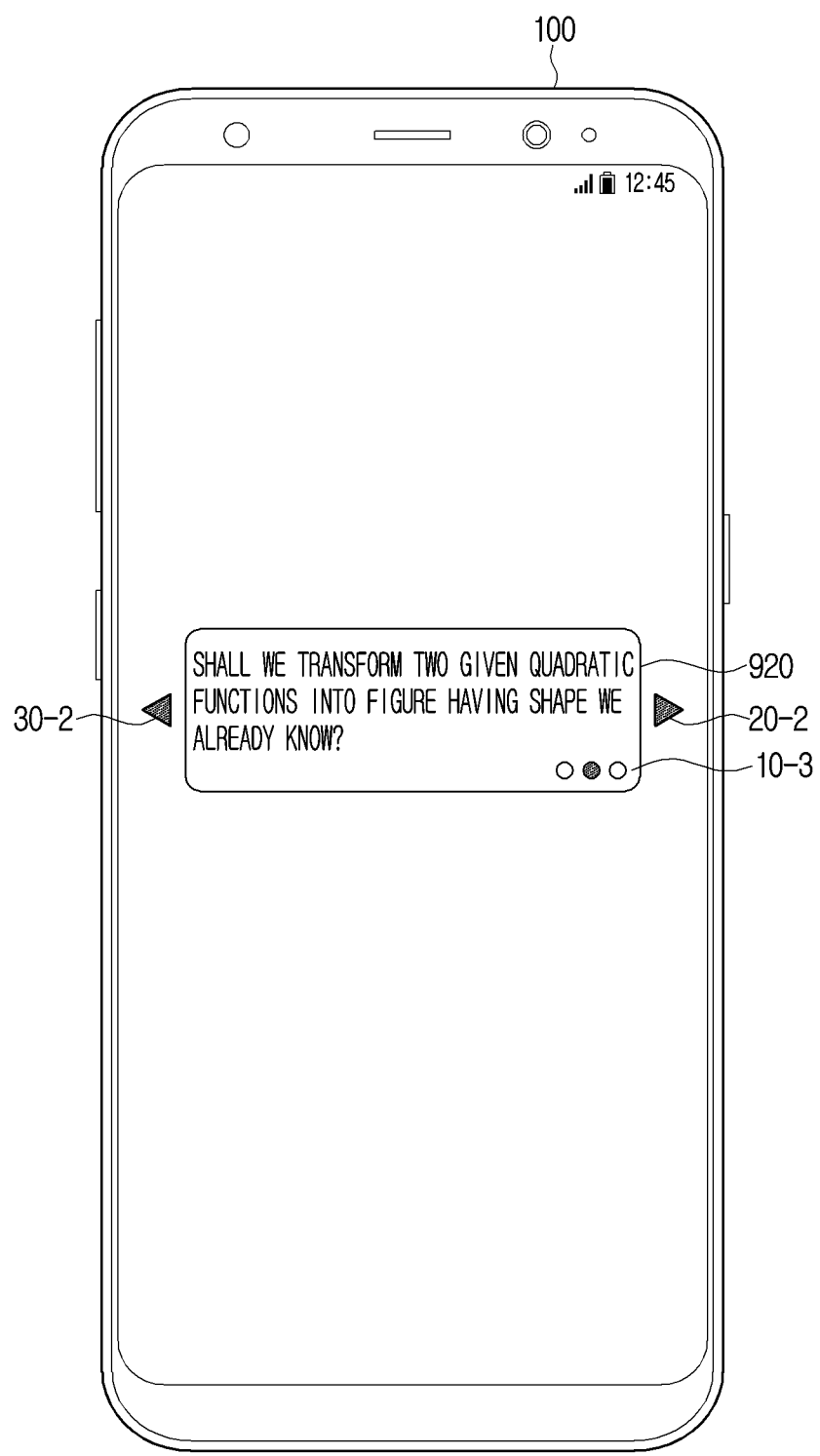
FIG. 9D is a diagram illustrating a UI for providing a hint according to an embodiment.

After the second hint information 920 of FIG. 9C is displayed, when the preset time (for example, 3 seconds) elapses, the electronic device 100 may display UIs 10-3, 20-2, and 30-2 for providing third hint information 930 on the first question 810 together with the second hint information 920 as illustrated in FIG. 9D. That is, referring to FIG. 9D, the icon 10-3 for displaying the number of pieces of hint information, the icon 20-2 for displaying next hint information, and the icon 30-2 for displaying the previous hint information may be displayed together with the second hint information 920.

Figure 9E:
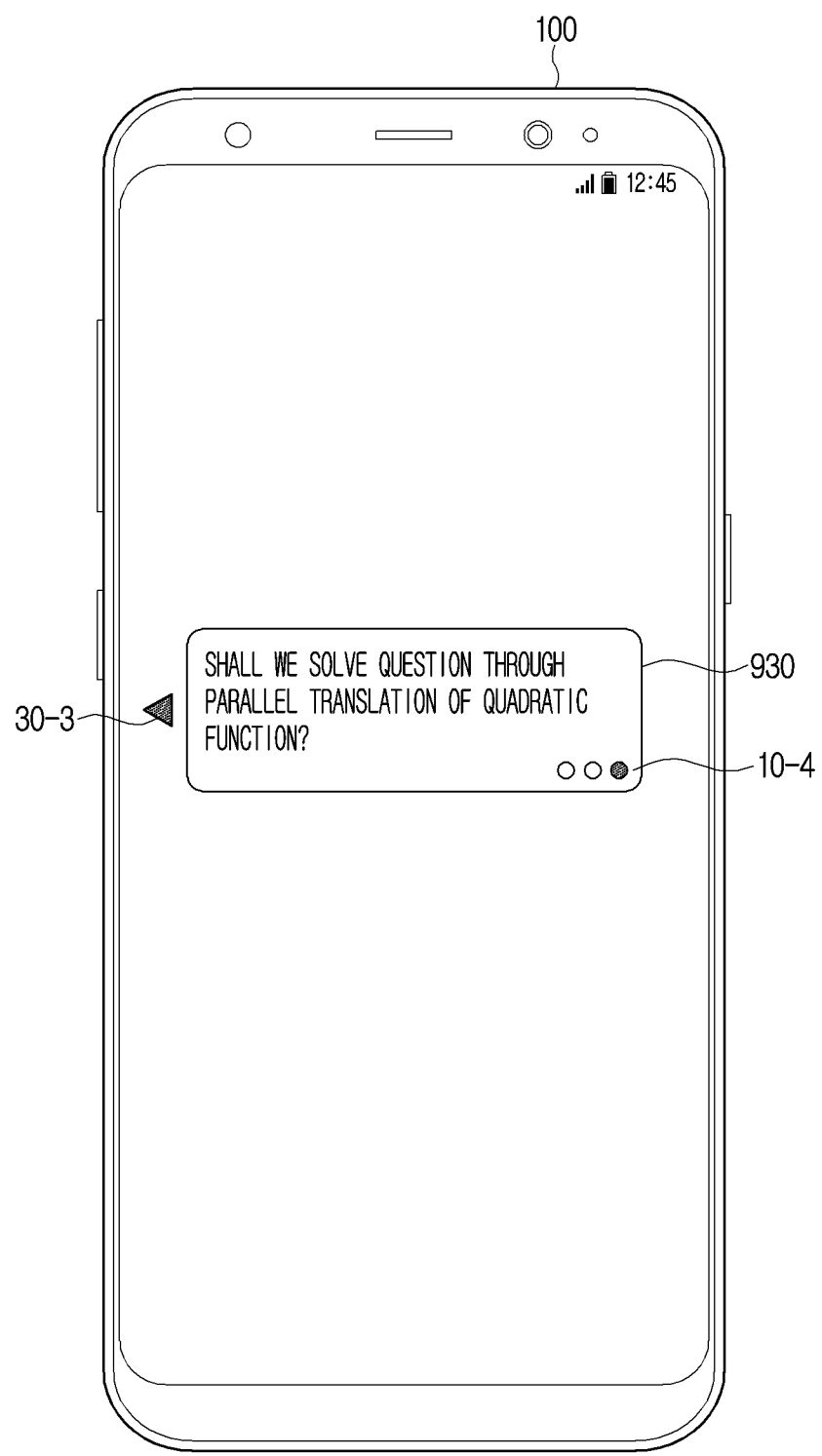
FIG. 9E is a diagram illustrating a UI for providing a hint according to an embodiment.

When the icon 20-2 for providing the next hint information is selected in FIG. 9D, the electronic device 100 may display the third hint information 930 as illustrated in FIG. 9E. In addition, the icon 10-4 for displaying the number of pieces of hint information and the icon 30-3 for displaying the previous hint information may be displayed on the display together with the third hint information 930.

Through the above-described process, the electronic device 100 may provide the hint information according to the user's achievement level, and the user may visually and intuitively recognize that the next hint information may be provided through icons.

Figure 10A:
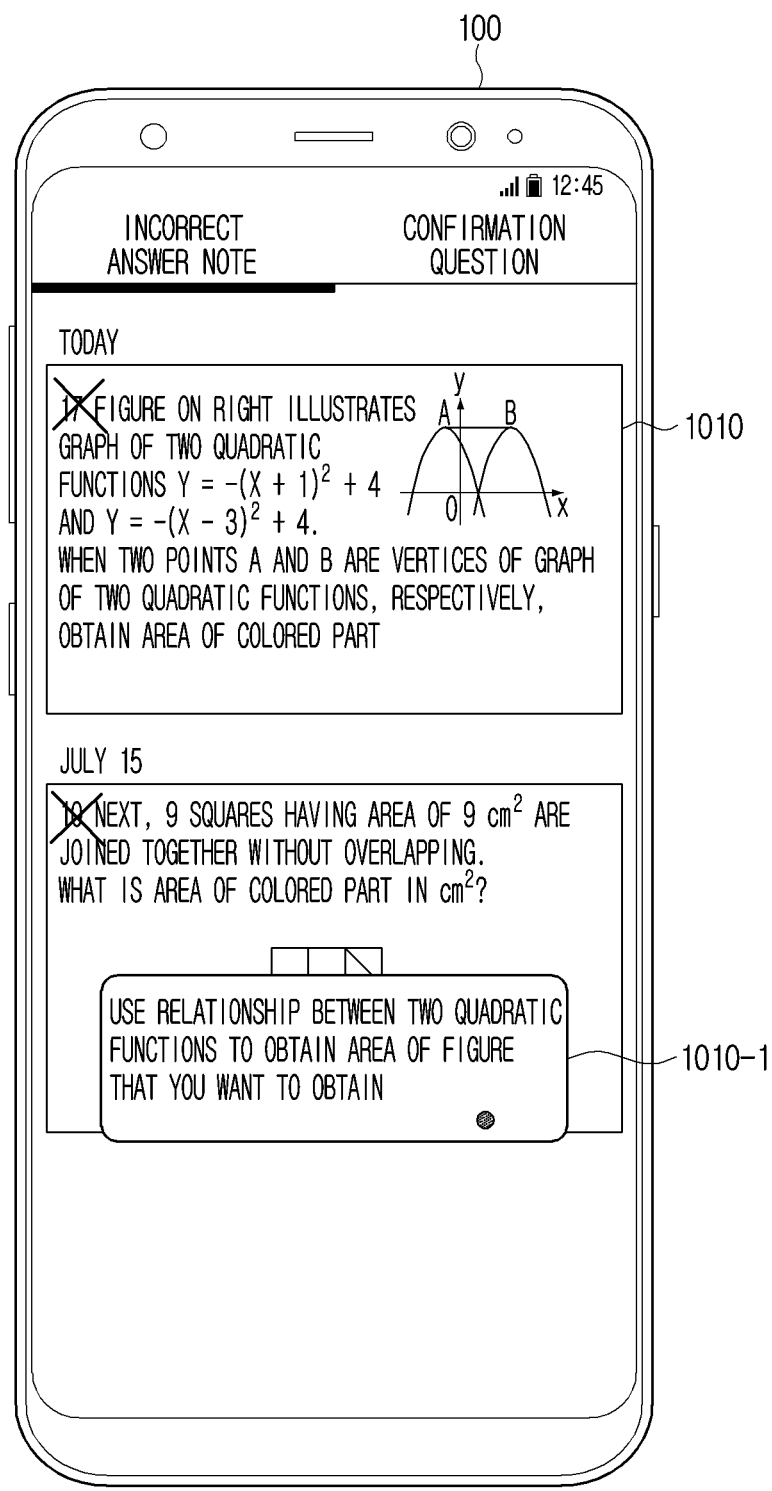
FIG. 10A is a diagram illustrating a method for providing hint information together with an incorrect answer according to an embodiment.

FIG. 10A is a diagram illustrating a method for providing hint information together with an incorrect answer question according to an embodiment.

According to an embodiment, when one question is selected while the incorrect answer question is displayed on the display as illustrated in FIG. 8A, the electronic device 100 may provide hint information on the selected question together with the selected question. As an embodiment, when a first question 1010 is selected from a plurality of incorrect answer questions while a plurality of incorrect answer questions are displayed on the display, the electronic device 100 may provide hint information 1010-1 on the selected first question 1010 that is displayed in a lower part of an area of the selected first question 1010. Here, although the hint information 1010-1 shown as overlapping with another incorrect answer question (i.e., July 15 question), one or more embodiments are not limited thereto, and the hint information 1010-1 may be displayed on the first question 1010 or any other area within the display of the electronic device. In addition, the plurality of hint information on the first question 1010 may be sequentially displayed in the manner described above with respect to FIGS. 9A to 9E.

Figure 10B:
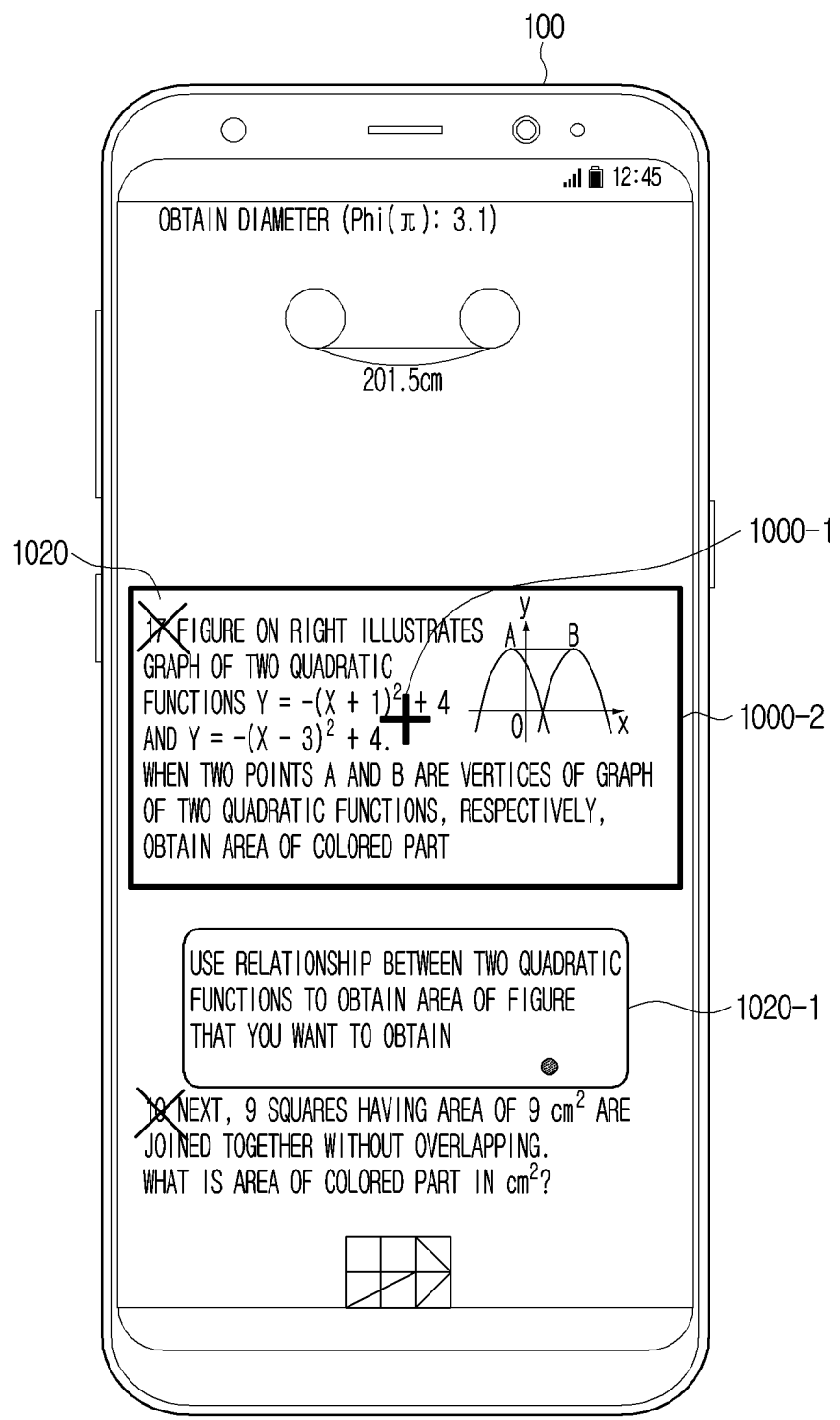
FIG. 10B is a diagram for describing a method for providing hint information in an image displayed on a display through a camera according to an embodiment.

FIG. 10B is a diagram for describing a method for providing hint information in an image displayed on a display through a camera according to an embodiment.

According to an embodiment, the electronic device 100 may further display a UI 1000-1 indicating a center point of the display in the image displayed on the display by the camera and a UI 1000-2 in the form of a rectangular box. In addition, the electronic device 100 may be configured to guide a user to move the camera of the electronic device 100 so that an area corresponding to one question is located in an area of the UI 1000-2. Further, the electronic device 100 may identify a question 1020 displayed in the UI 1000-2. In addition, when the question 1020 displayed in the area of the UI 1000-2 is identified, the electronic device 100 may display hint information 1020-1 on or below the identified question 1020 in one area of the display. That is, referring to FIG. 10B, when a question is identified in the UI 1000-2, the hint information 1020-1 on the identified question 1020 may be displayed an area under the area of the UI 1000-2. In addition, the plurality of hint information on the identified question may be sequentially displayed in the manner described above with respect to FIGS. 9A to 9E.

FIGS. 11A to 11D are diagrams for describing a UI of an application for a learning assistance function according to an embodiment.

Figure 11A:
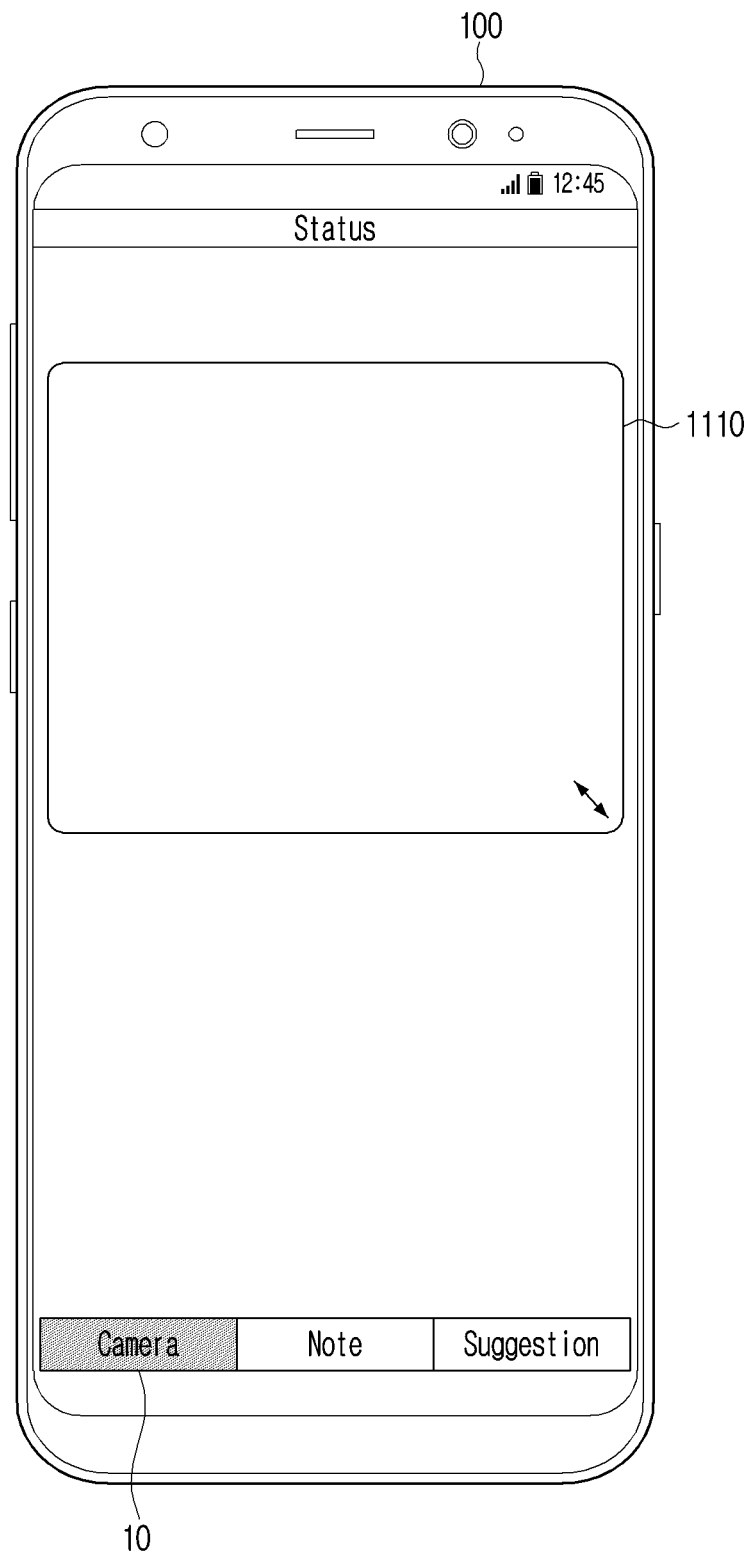
FIG. 11A is a diagram for describing a UI of an application for a learning assistance function according to an embodiment.

Referring to FIG. 11A, the electronic device 100 may display an interface for the photographing mode on the display. The electronic device 100 may display an image being photographed by the camera on an area 1110 of the display. In addition, the electronic device 100 may identify a question in which the scoring information is displayed by a user through an image displayed on the area 1110 of the display.

Figure 11B:
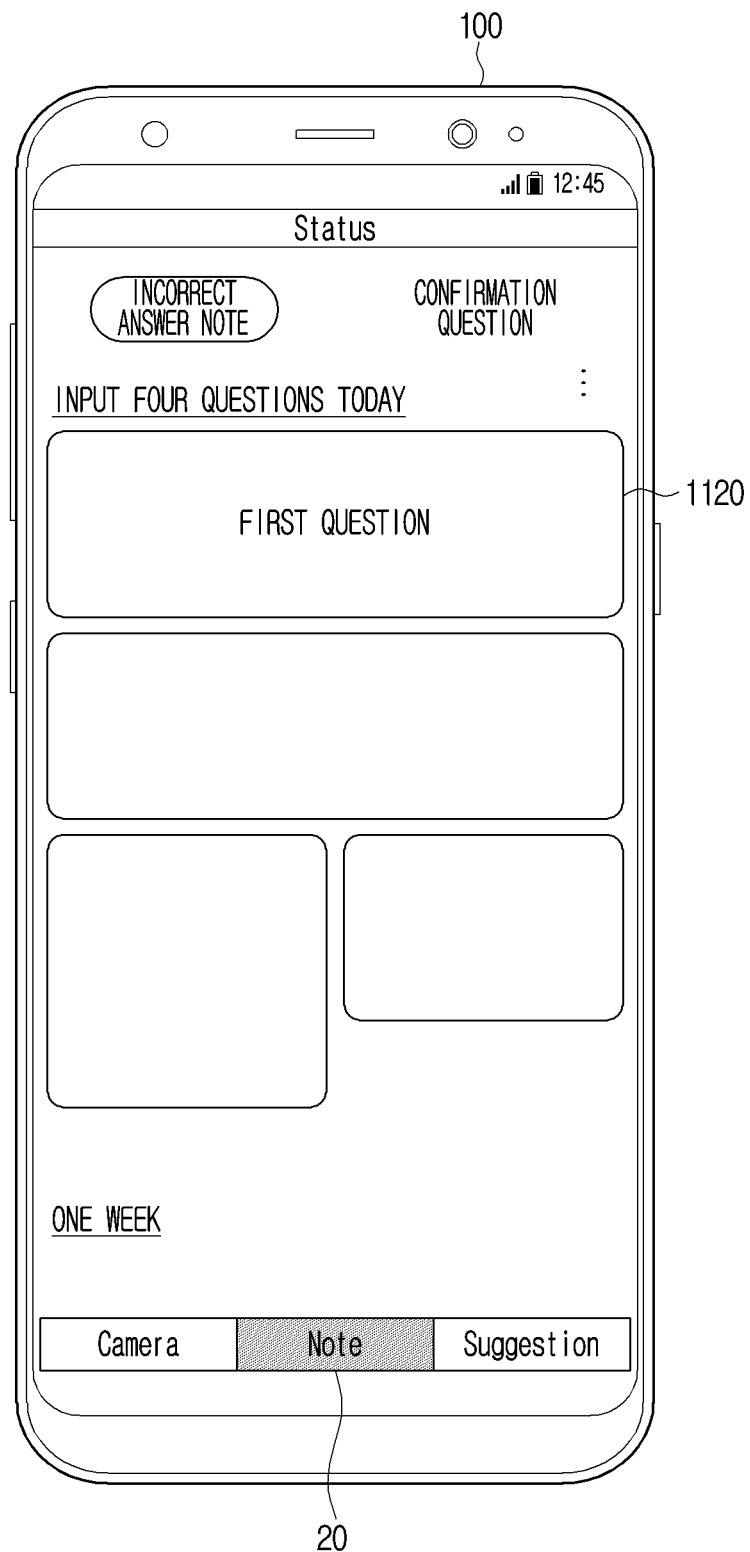
FIG. 11B is a diagram for describing a UI of an application for a learning assistance function according to the embodiment.

In addition, when a user command for displaying an incorrect answer note is input, the electronic device 100 may display an interface for an incorrect answer mode on the display 130 of the electronic device 100. For example, when the note icon 20 is selected as illustrated in FIG. 11B, the electronic device 100 may display at least one question classified as the incorrect answer question on the display 130. According to an embodiment, the electronic device 100 may preferentially display the question classified as the incorrect answer question today on the display 130 as illustrated in FIG. 11B.

Figure 11C:
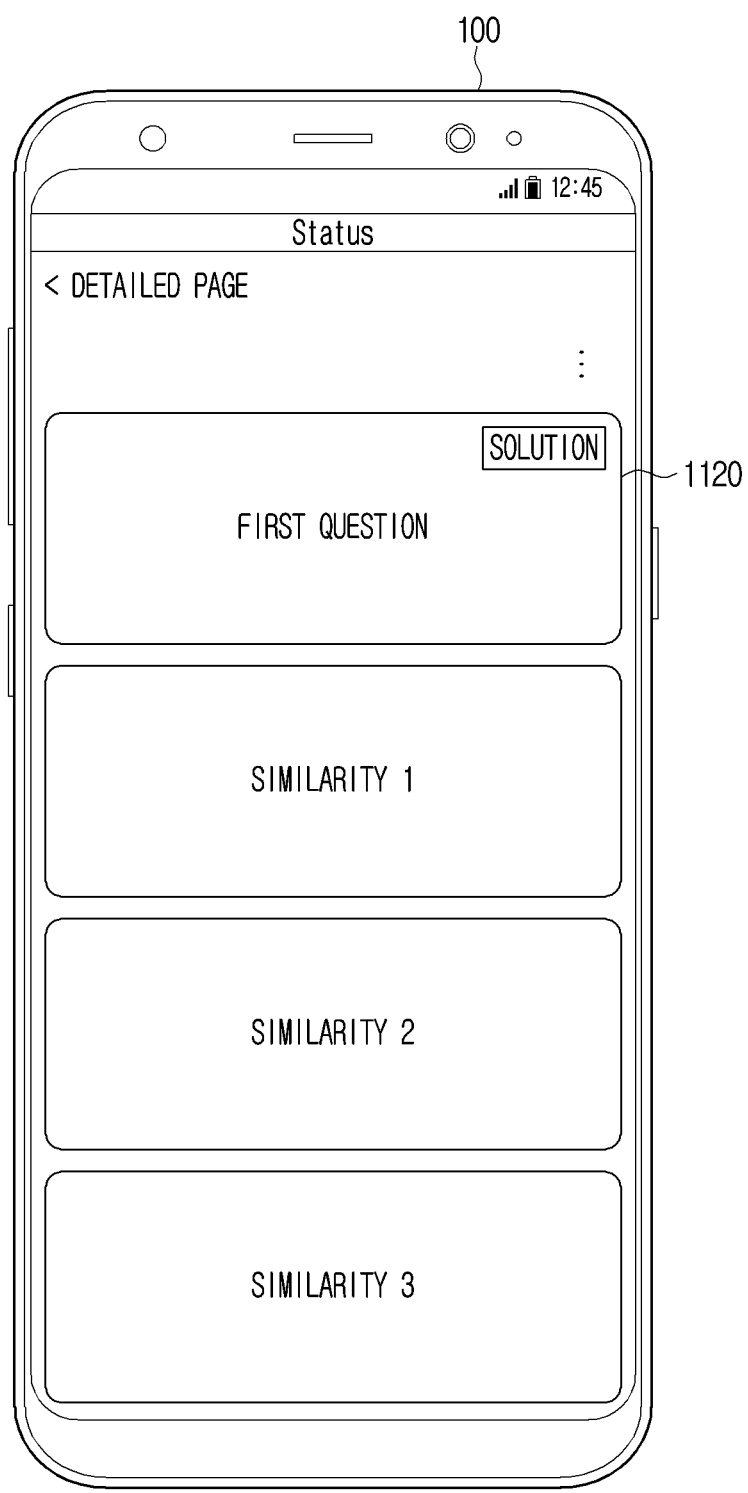
FIG. 11C is a diagram for describing a UI of an application for a learning assistance function according to an embodiment.
Figure 11D:
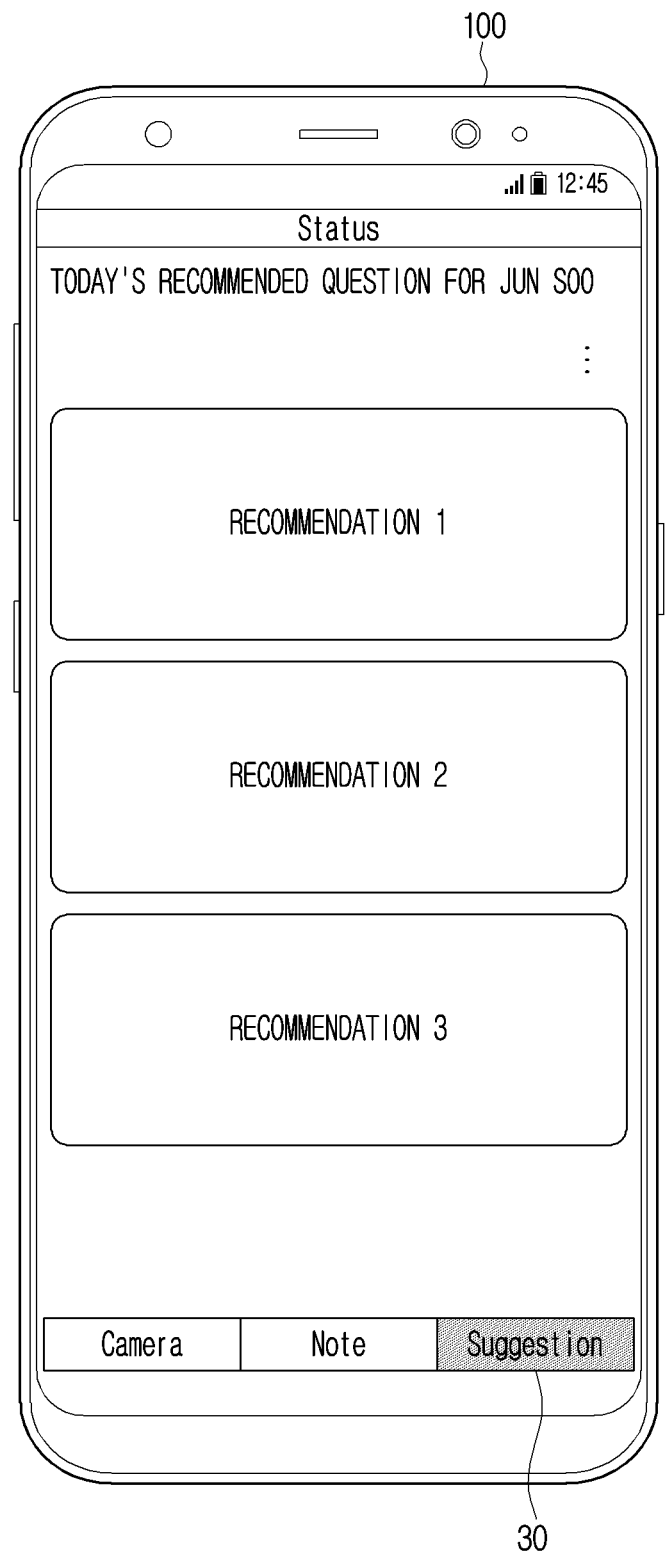
FIG. 11D is a diagram for describing a UI of an application for a learning assistance function according to an embodiment.

In addition, when one of the displayed at least one question is selected, the electronic device 100 may display a similar question to the selected question on the display 130 together with the selected question. For example, when the first question 1120 of FIG. 11B is selected, the electronic device 100 may display a first question 1120 and three similar questions (e.g., similarity 1 to similarity 3) to the first question, as illustrated in FIG. 11C. As an embodiment, a similar question to the first question 1120 may be a question having the same representative type as the first question.

In addition, when a user command for displaying a recommended question is input, the electronic device 100 may display an interface for a recommendation question mode on the display 130. For example, referring to FIG. 11D, when a suggestion icon 30 is selected, the electronic device 100 may display at least one recommended question according to the user's achievement level on the display 130. Further, the electronic device 100 may provide the recommended question based on the question classified as the incorrect answer note. For example, the electronic device 100 may identify a representative type for at least one question classified as the incorrect answer question today, and display, as the recommended question, a question for the same type as the identified representative type on the display. In addition, the electronic device 100 may display, as the recommended question, a question of a difficulty level suitable for the user's achievement level on the display in consideration of the achievement level by representative type of the user.

Figure 12A:
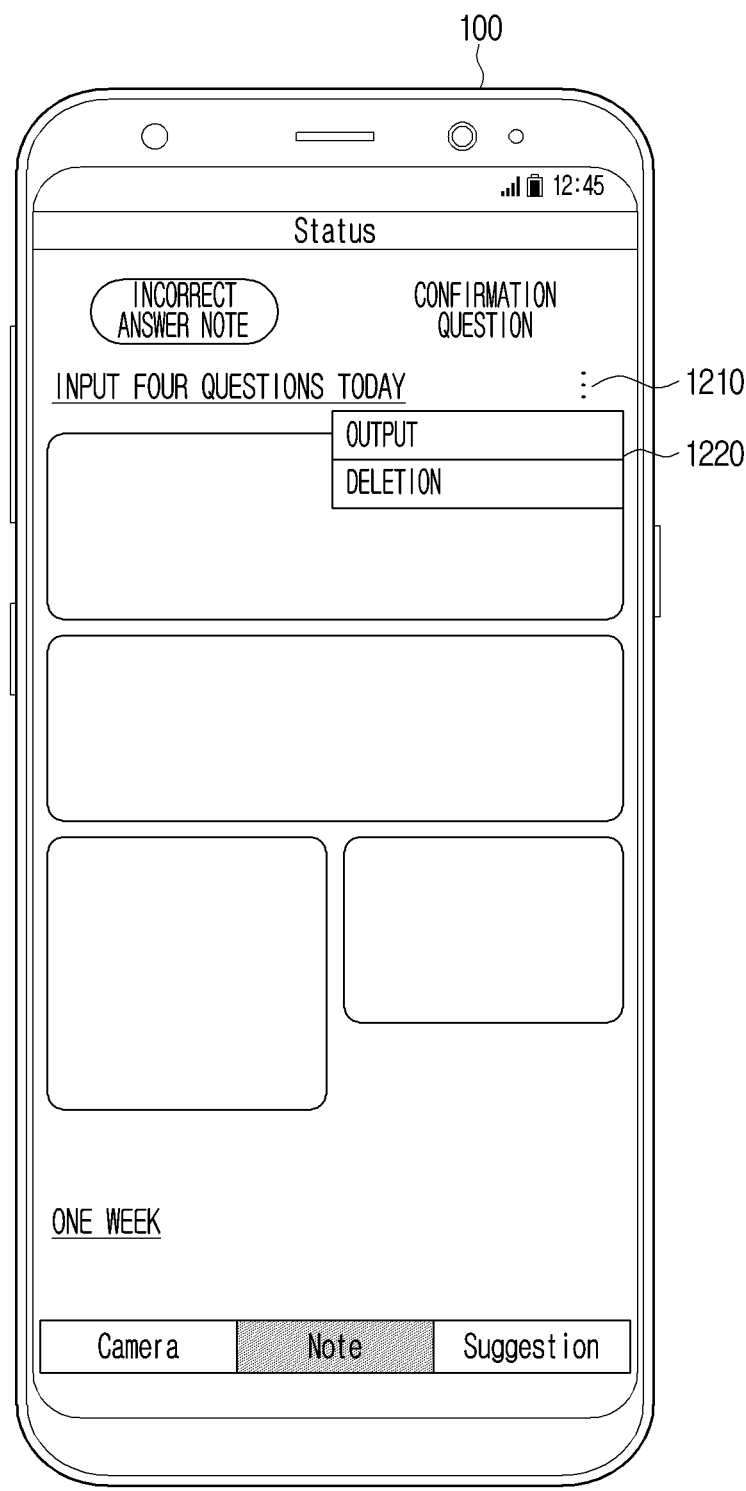
FIG. 12A is a diagram illustrating a method for generating a file including at least one question displayed as an incorrect answer according to an embodiment.
Figure 12B:
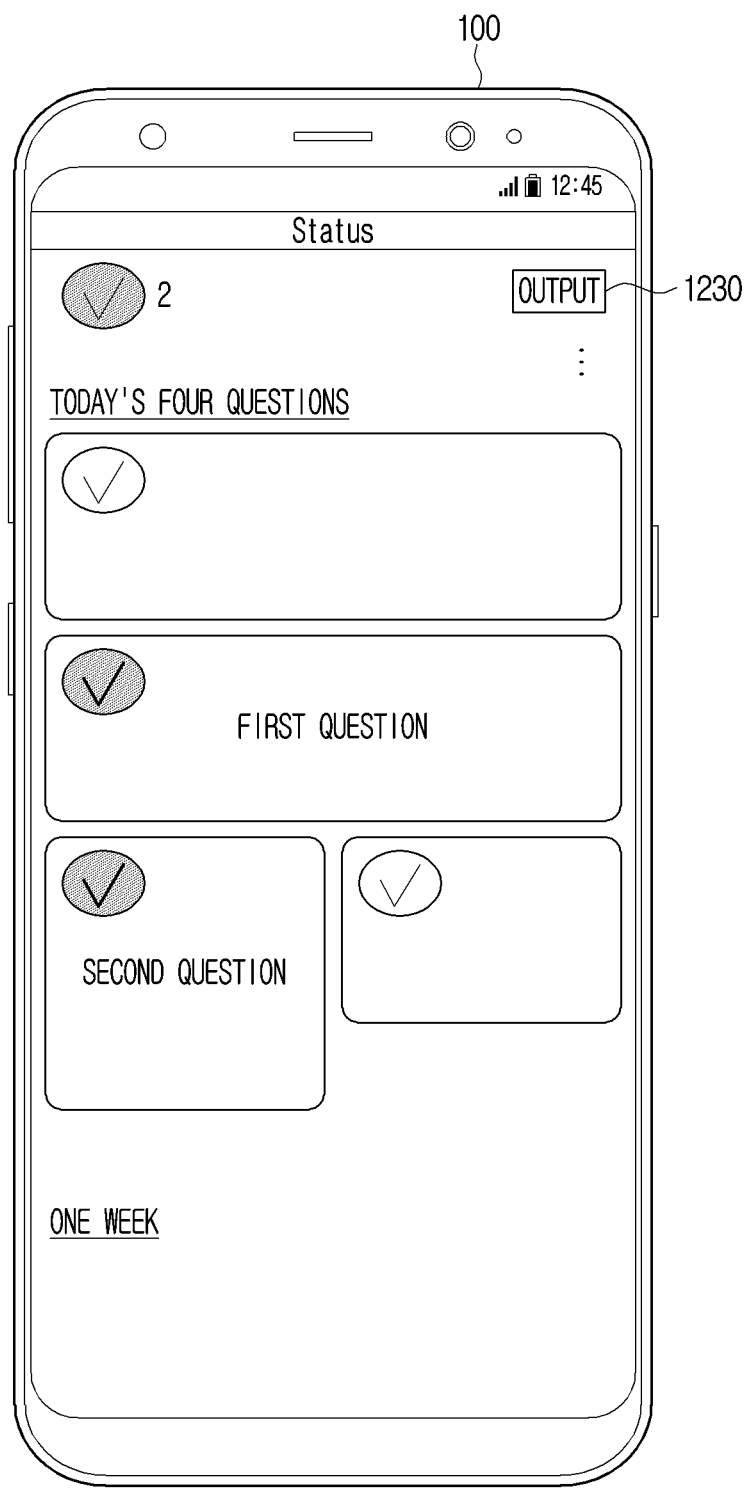
FIG. 12B is a diagram illustrating a method for generating a file including at least one question displayed as an incorrect answer according to an embodiment.
Figure 12C:
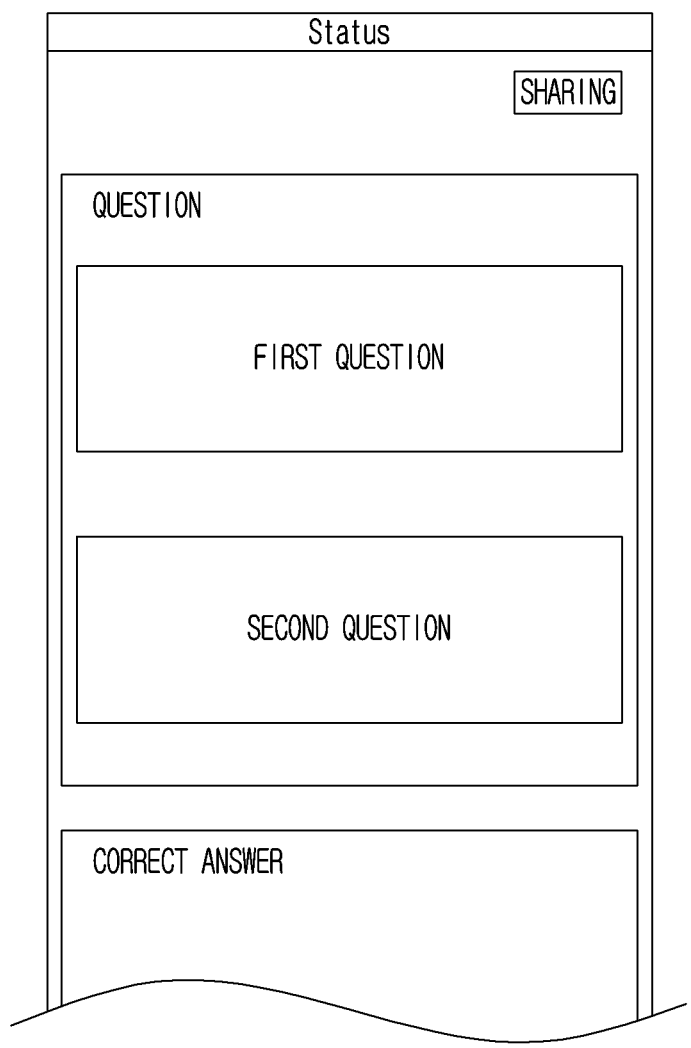
FIG. 12C is a diagram illustrating a method for generating a file including at least one question displayed as an incorrect answer according to an embodiment.

FIGS. 12A to 12C are diagrams illustrating a method for generating a file including at least one question displayed as an incorrect answer question according to an embodiment.

According to an embodiment, when a user command for displaying an incorrect answer note is input, the electronic device 100 may display an interface for an incorrect answer mode on the display 130. In addition, when an icon 1210 for editing the incorrect answer note is selected, the electronic device 100 may display a UI 1220 for editing the incorrect answer note on the interface for the incorrect answer mode as illustrated in FIG. 12A. In addition, when an output icon is selected in the UI 1220, the electronic device 100 may select a question to be included in an output file. For example, when the first question and the second question are selected as illustrated in FIG. 12B and the output icon 1230 is selected, the electronic device may generate a file including the first question and the second question as illustrated in FIG. 12C and store the generated file in the memory.

Figure 13:
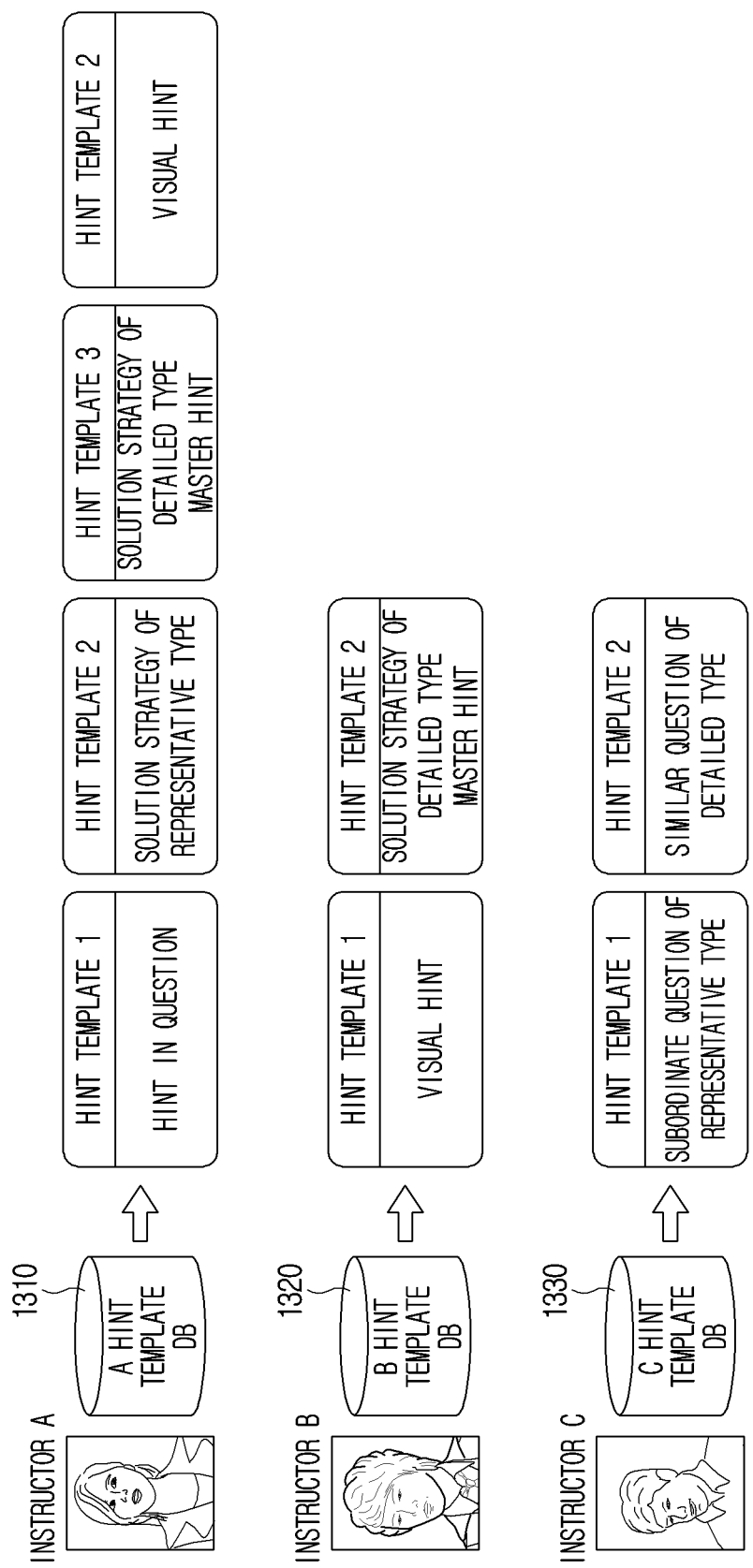
FIG. 13 is a diagram for describing a method for providing a hint according to a teaching method according to an embodiment.

FIG. 13 is a diagram for describing a method for providing a hint based on a teaching method according to an embodiment.

According to an exemplary embodiment, the electronic device 100 may provide different hint information according to teaching methods for each instructor for the same question.

That is, as illustrated in FIG. 13, each hint template DBs related to a teaching method of a corresponding instructor may be stored in a memory. However, one or more embodiments of the disclosure are not limited thereto, and the hint template DBs for each instructor may be stored in an external server. For example, an "A" hint template 1310 for an instructor A may include hint information related to a teaching method for improving a student's mathematical problem solving skills. A "B" hint template 1320 for an instructor B may include hint information related to a teaching method that provides an immediate solution method according to a strategic approach. In addition, a C hint template 1330 for instructor C may include hint information related to a teaching method for understanding a concept for attacking a high-difficulty question.

The hint providing module 260 (shown in FIG. 1) according to an embodiment may generate a hint template DB for each instructor through a questionnaire provided for each instructor. For example, a question included in a questionnaire for each instructor may be classified by representative type through the question identification module 210 and the question classification module 230. In addition, the hint providing module 260 may generate a hint template DB of a corresponding instructor according to a representative type based on answer information on the corresponding question included in the questionnaire. However, one or more embodiments of the disclosure are not limited thereto, and the hint template DB for each instructor may be generated in an external server, and the external server may provide the hint information for each instructor to the electronic device 100.

According to an embodiment, a user may select an instructor to receive hint information. That is, in the application for learning assistant function according to one or more embodiments, when the user selects hint information provided by the instructor A, the electronic device 100 may generate and provide the hint information on the question based on the A hint template 1310 corresponding to the instructor A.

However, one or more embodiments of the disclosure are not limited thereto, and an instructor providing hint information according to a user's achievement level may be identified, and hint information may be provided based on a hint template related to the identified instructor. For example, when a teaching method of the instructor C is a teaching method for top-ranked students and a teaching method of the instructor A is a teaching method for middle-ranked students, if the user's achievement level for a question is identified as a middle achievement level (e.g., level 3), the electronic device 100 may generate and provide hint information based on the A hint template 1310 related to the instructor A for the question.

Figure 14:
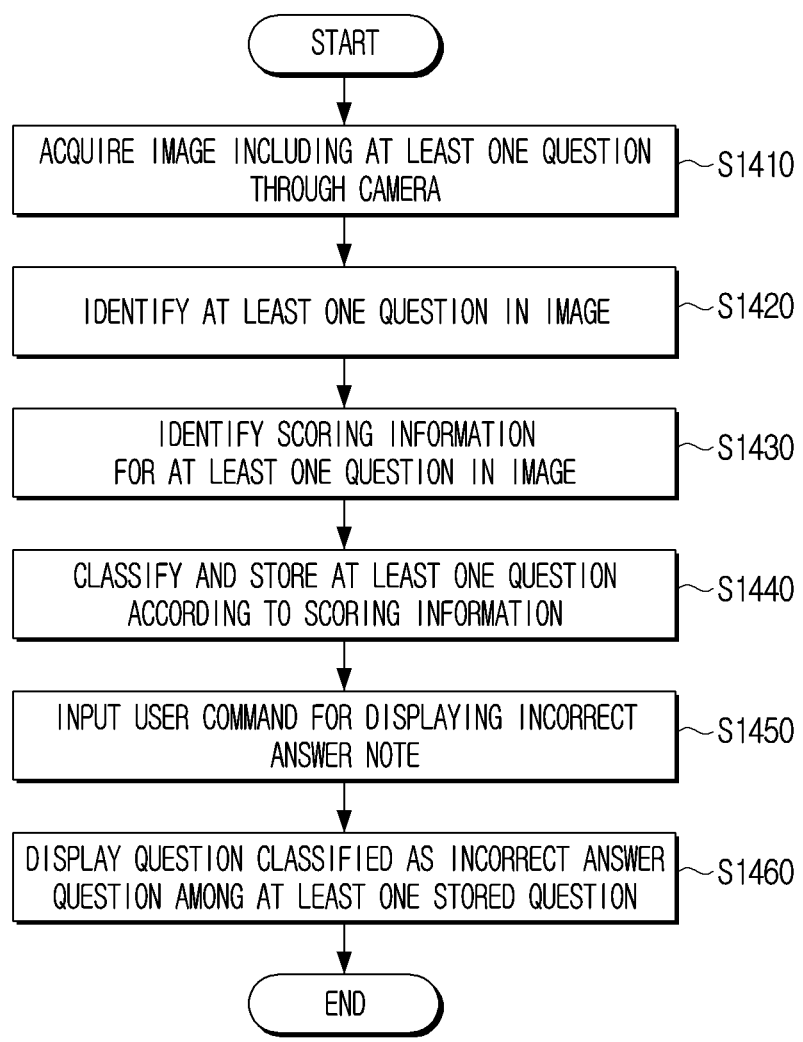
FIG. 14 is a flowchart for describing a method for controlling an electronic device according to an embodiment.

FIG. 14 is a flowchart for describing a method for controlling an electronic device according to an embodiment.

Referring to FIG. 14, first, the electronic device 100 may acquire an image including at least one question through a camera (S1410). For example, through a user input of photographing an image displayed on a display by a camera, the electronic device 100 may acquire an image including at least one question.

When an image including at least one question is acquired, the electronic device 100 may identify at least one question in the acquired image (S1420). For example, the electronic device 100 may identify at least one question in the acquired image through the question identification module. However, the control method is not limited to steps S1410 and S1420, and the electronic device 100 may display an image acquired by the camera on the display, and the electronic device 100 may identify at least one question in the displayed image. In addition, when at least one question is identified in the displayed image, the electronic device 100 may acquire an image including at least one question.

When at least one question is identified, the electronic device 100 may identify the scoring information for the at least one question in the acquired image (S1430). According to an embodiment, a symbol may be displayed in at least one question by a user, and the symbol for at least one question may be identified by a camera to obtain the scoring information.

The electronic device 100 may classify and store at least one question identified in the image according to the scoring information (S1440). Here, the question classification module of the electronic device 100 may classify at least one question identified in the image using the identified scoring information as at least one from among a correct answer question, a confirmation question, and an incorrect answer question, and store the classified at least one question.

In addition, when a user command for displaying an incorrect answer note is input (S1450), the electronic device 100 may display a question classified as an incorrect answer question among at least one stored question classified and stored according to the scoring information (S1460). In an embodiment, when a user command for displaying an incorrect answer note is input, the electronic device 100 may display a question, which is processed as an incorrect answer question among at least one question classified and stored according to the scoring information, in the acquired order. Also, the electronic device 100 may display a question processed as an incorrect answer question in the order in which the question processed as the incorrect answer question is stored. However, one or more embodiments of the disclosure are not limited thereto, and the incorrect answer question may be displayed by date or question type.

Figure 15:
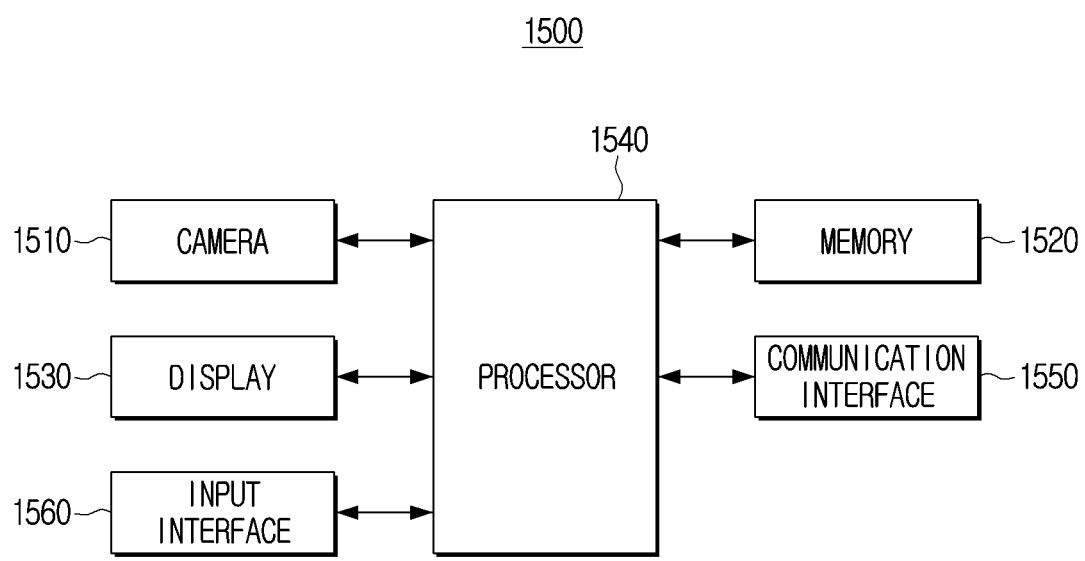
FIG. 15 is a block diagram illustrating an electronic device according to an embodiment.

FIG. 15 is a block diagram illustrating an electronic device according to an embodiment.

Referring to FIG. 15, the electronic device 1500 may include a camera 1510, a memory 1520, a display 1530, a processor 1540, a communication interface 1550, and an input interface 1560. Here, the camera 1510, the memory 1520, the display 1530, and the processor 1540 are the same as the configuration of the electronic device 100 illustrated in FIG. 2, and therefore, repetitive descriptions thereof will be omitted.

The communication interface 1550 is a component for performing communication with various types of external devices. The communication interface 1550 may perform communication with an external device and/or an external server in a wireless communication manner such as Wi-Fi, Bluetooth, NFC, infrared data association (IrDA), radio frequency identification (RFID), ultra-wideband (UWB), Wi-Fi direct, Z-wave, Zigbee, 4LoWPAN, General Packet Radio Service (GPRS), Weightless, digital living network alliance (DLNA), ANT+, digital enhanced cordless telecommunications (DECT), a wireless local area network (WLAN), global system for mobile communications (GSM), universal mobile telecommunication system (UMTS), and wireless broadband (WiBRO). The communication interface 1550 may be implemented as at least one communication chip, a transceiver, a communication port, or the like. The electronic device 1500 according to an embodiment may communicate with a relay device and a server through the communication interface 1550 by a remote communication method.

According to an embodiment, some of the modules for implementing the learning assistant function according to one or more embodiments of the disclosure may be implemented in the external server, and the electronic device 1500 may communicate with the external server including some modules for implementing the learning assistant function through the communication interface 1550 to implement the application for learning assistant function.

The input interface 1560 may receive a user command. The input interface 1560 may include at least one of a physical button, a voice recognition sensor, and a touch sensor for receiving a user command. The touch sensor may be implemented in the form of a touch screen that detects a user's touch manipulation. In this case, the input interface 1560 includes a touch screen, and the user may input a user command by touching the touch screen. The input interface 1560 may also include a physical button, and the user may input a user command by pressing the physical button. In addition, the input interface 1560 may include a voice recognition sensor, and the user may input a user command by uttering a user voice through a microphone. In the above, the case of including the physical button and the voice recognition sensor for the input interface 1560 has been described as examples, however, the input interface 1560 may include various configurations capable of receiving the user command by interacting with the user.

The user may input a user command for displaying an incorrect answer note through the input interface 1560. For example, the user may select one of at least one question displayed on the display 1530 through the input interface 1560 and obtain a similar question to the selected question or hint information to the selected question.

Figure 16:
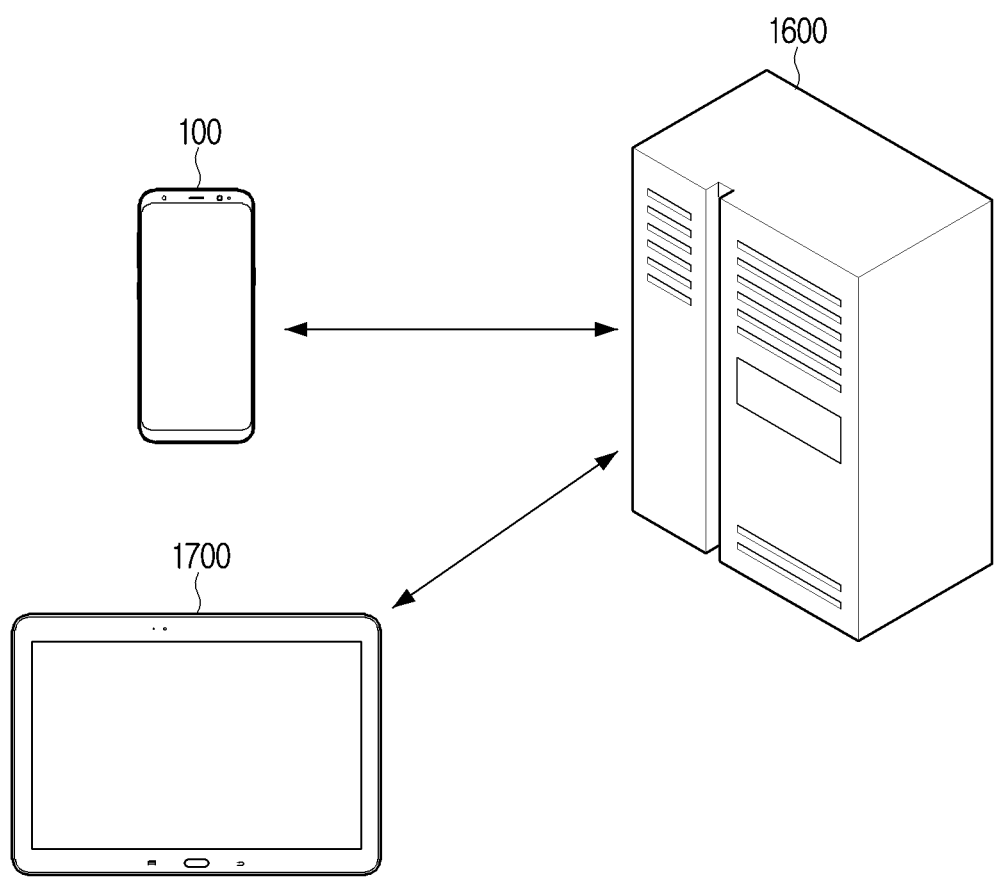
FIG. 16 is a diagram for describing a method for implementing an application for a learning assistance function through a server according to an embodiment.

FIG. 16 is a diagram for describing a method for implementing an application for a learning assistance function through a server according to an embodiment.

As described above, FIG. 1 illustrates that the learning assistant function is implemented through the processor 140 of the electronic device 100. According to an embodiment, the learning assistant function may be implemented through the server 1600. In addition, the user may receive a learning assistant function by using the electronic device 100 that communicates with an external device 1700 including a display.

Referring to FIG. 16, the electronic device 100 may acquire an image including at least one question through a camera 110. When the image is acquired, the electronic device 100 may transmit the acquired image to the server 1600.

When the server 1600 receives an image from the electronic device 100, the server 1600 may perform the learning assistant function described in FIG. 1. As the learning assistant function is performed, the server 1600 may identify at least one question in the received image and identify scoring information displayed by the user for the at least one question. In addition, at least one identified question may be classified and stored by representative type. For an example, as described in FIG. 1, when the identified question is identified as a new representative type, the server 1600 may generate a hint scenario for the new representative type. In addition, the server 1600 may acquire a similar question to a question identified in a received image from among the representative type DBs pre-stored in the server 1600.

Further, the user may use the electronic device 100 or the external device 1700 to request the server 1600 for a command related to the learning assistant function.

For example, when a user command for displaying an incorrect answer question is input through the electronic device 100, the electronic device 100 may request the server 1600 for the question classified as the incorrect answer question and receive the information on the question classified as the incorrect answer question from the server 1600. Based on receiving the incorrect answer question from the server 1600, the electronic device 100 may display a question classified as an incorrect answer question on the display 130.

Figure 17:
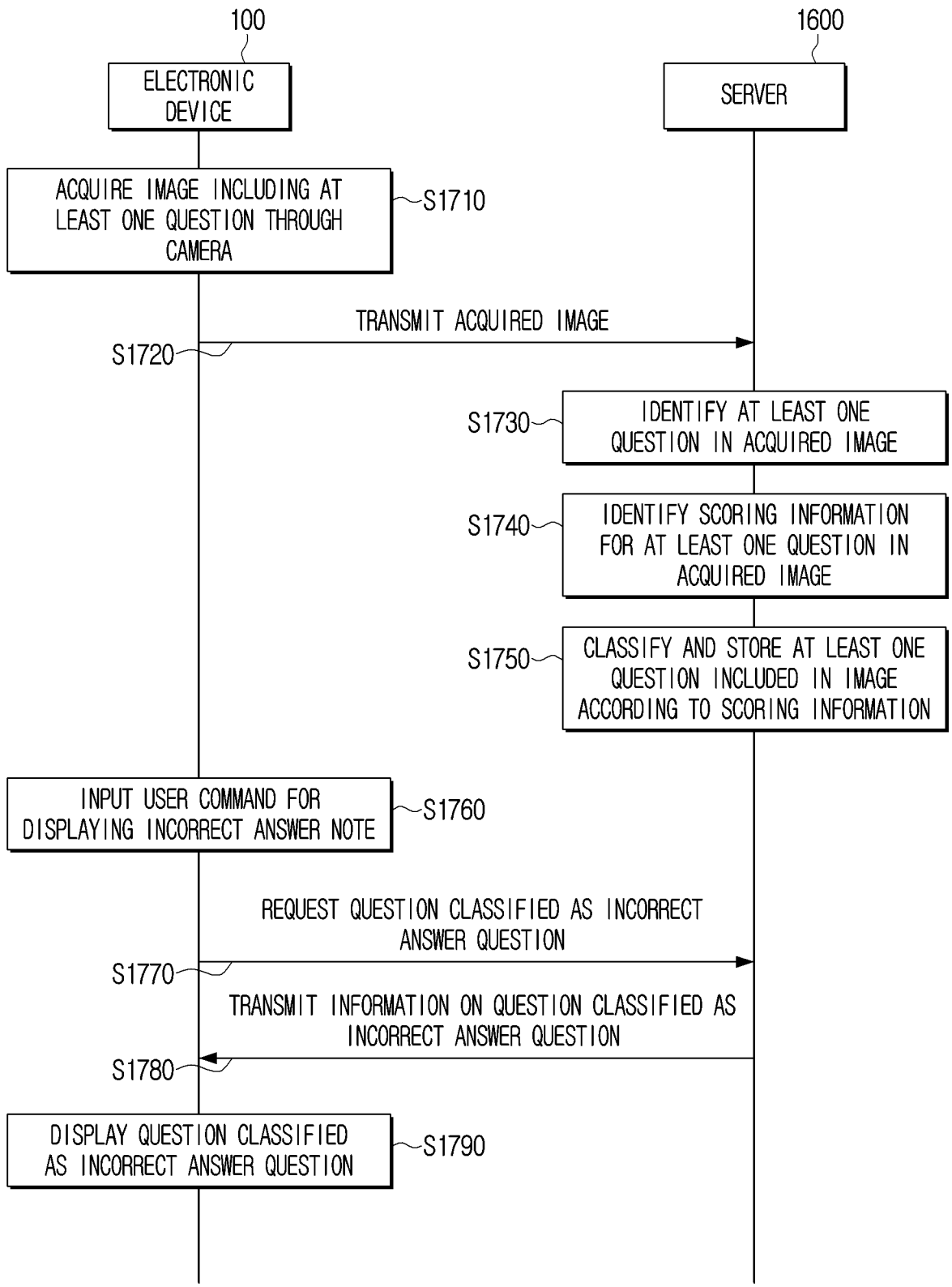
FIG. 17 is a sequence diagram for describing an operation between an electronic device and a server according to an embodiment.

As another example, when a user command for displaying hint information on a first question is input through the external device 1700, the external device 1700 requests the server 1600 for hint information on the first question to receive the hint information corresponding to the first question from the server 1600. In addition, the external device 1700 may display the hint information on the first question on the display of the external device 1700. FIG. 17 is a sequence diagram for describing an operation between an electronic device and a server according to an embodiment.

Referring to FIG. 17, the electronic device 100 may acquire an image including at least one question through a camera (S1710). When the image is acquired, the electronic device 100 may transmit the acquired image to the server 1600 (S1720). When the server 1600 receives the acquired image from the electronic device 100, the server 1600 may identify at least one question in the acquired image (S1730). In addition, the server 1600 may identify scoring information for at least one question in the acquired image (S1740). The server 1600 may classify and store at least one question included in the acquired image according to the scoring information (S1750).

Further, when a user command for displaying an incorrect answer note is input through the electronic device 100, the electronic device 100 may request the server 1600 for the question classified as the incorrect answer question (S1760). In addition, the server 1600 may transmit information on the question classified as the incorrect answer question to the electronic device 100 in response to the request from the electronic device 100 (S1770).

When the electronic device 100 receives the information on the question classified as the incorrect answer question from the server 1600, the electronic device 100 may display the question classified as the incorrect answer question (S1780).

One or more embodiments of the disclosure are described with reference to the accompanying drawings. However, it is to be understood that the embodiments described in the disclosure are not limited to specific embodiments, but may include all modifications, equivalents, and substitutions without departing from the spirit and scope of the disclosure. That is, in the embodiments described above, the learning assistant function has been described as performing a learning assistant function for a mathematics subject, but the one or more embodiments are not limited thereto, and may include a variety of subjects that may be included in the curriculum of elementary, middle, and high school students, educational media related to entrance exams, and educational media for adults.

Throughout the disclosure, similar components are denoted by similar reference numerals. Expressions "have", "may have", "include", "may include", or the like, may indicate existence of a corresponding feature (for example, a numerical value, a function, an operation, a component such as a part, or the like), and do not exclude existence of an additional feature.

In the disclosure, an expression "A or B", "at least one of A and/or B", "one or more of A and/or B", or the like, may include all possible combinations of items enumerated together. For example, "A or B", "at least one of A and B", or "at least one of A or B" may indicate all of 1) a case in which at least one A is included, 2) a case in which at least one B is included, or 3) a case in which both of at least one A and at least one B are included.

Expressions "first", "second", '1st" or "2nd" or the like, may indicate various components regardless of a sequence and/or importance of the components, and are used in order to distinguish one component from the other components, and do not limit the corresponding components. For example, a first user device and a second user device may indicate different user devices regardless of a sequence or importance thereof. For example, the 'first' component may be named the 'second' component and the 'second' component may also be similarly named the 'first' component, without departing from the scope of the disclosure.

The terms such as "module", "unit", and "part" used in the disclosure may refer to components that perform at least one function or operation, and these components may be implemented in hardware or software or implemented as a combination of hardware and software. In addition, a plurality of "modules", "units", "parts", and the like may be integrated into at least one module or chip to be implemented in at least one processor, except when each of them needs to be implemented as individual specific hardware.

Terms used herein may be used in order to describe specific embodiments rather than limiting the scope of the embodiments. Singular forms may include plural forms unless the context clearly indicates otherwise. All terms used herein including technical and scientific terms have the same meanings as those that are generally understood by those skilled in the art to which the disclosure pertains. Terms used in the disclosure should be construed in the context of the disclosure, and should not be construed as or limited to those terms defined in a common dictionary or other definitions outside the disclosure.

An electronic device according to various embodiments may include at least one of, for example, a smartphone, a tablet personal computer (PC), a mobile phone, an image phone, an e-book reader, a desktop personal computer (PC), a laptop personal computer (PC), a netbook computer, a workstation, a server, a personal digital assistant (PDA), a portable multimedia player (PMP), an MP3 player, a mobile medical device, a camera, a wearable device, or the like.

According to some embodiments, an electronic device may include at least one of a portion of a furniture or a building/structure, an electronic board, an electronic signature receiving device, a projector, or various meters (for example, water, electricity, gas, electric wave meter, or the like. In various embodiments, an electronic device may be one or a combination of one or more of various devices described above. The electronic device according to some embodiments may be a flexible electronic device. In addition, as the electronic device according to the embodiment of the present document, there may be an electronic device that is connected to the external Internet through connection with network equipment such as an access point (AP), a gateway, a router, or a switch in addition to the above-described devices, and a new electronic device according to the development of technology.

Various embodiments described above may be implemented in software, hardware, or a combination thereof. According to a hardware implementation, embodiments described in the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions. In particular, various embodiments described above may be implemented by the processor 140 of the electronic device 100. According to a software implementation, embodiments such as procedures and functions described in the one or more embodiments may be implemented by separate software modules. Each of the software modules may perform one or more functions and operations described in the one or more embodiments.

Various embodiments of the disclosure may be implemented in software including instructions stored in a machine (for example, a non-transitory computer-readable storage medium). A machine is a device capable of calling a stored instruction from a storage medium and operating according to the called instruction, and may include the electronic device 100 according to the embodiments.

In the case in which the instruction is executed by the processor, the processor may directly perform a function corresponding to the command or other components may perform the function corresponding to the instruction under a control of the processor. The instruction may include codes generated or executed by a compiler or an interpreter. For example, by causing the processor to execute the instruction stored in the storage medium, the above-described method for controlling an electronic device may be executed. For example, by causing the processor of the device (or electronic device) to execute the instruction stored in the storage medium, an operation of acquiring a list including at least one relay device for initial connection with an external device and displaying the acquired list on a display, an operation of transmitting a connection request for the selected relay device to the selected relay device when one relay device is selected from the list, an operation of displaying a list of at least one external device capable of performing connection by the relay device on the display when connection approval information is received from the relay device, an operation of receiving an authentication request for the selected external device from the selected external device when one external device is selected from the list of the at least one external device, and an operation of performing an initial connection with the selected external device when a user input is received in response to the authentication request may be performed.

The machine-readable storage medium may be provided in a form of a non-transitory storage medium. Here, the term 'non-transitory' means that the storage medium is tangible without including a signal, and does not distinguish whether data are semi-permanently or temporarily stored in the storage medium.

The methods according to the one or more embodiments may be included and provided in a computer program product. The computer program product may be traded as a product between a seller and a purchaser. The computer program product may be distributed in a form of a storage medium (for example, a compact disc read only memory (CD-ROM)) that may be read by a device or online through an application store (for example, PlayStore™, Appstore™). In case of the online distribution, at least a portion of the computer program product may be at least temporarily stored in a storage medium such as a memory of a server of a manufacturer, a server of an application store, or a relay server or be temporarily generated.

Each of components (for example, modules or programs) according to the one or more embodiments described above may include a single entity or a plurality of entities, and some of the corresponding sub-components described above may be omitted or other sub-components may be further included in the one or more embodiments. In addition, some constituent elements (for example, a module or a program) may be integrated into a single entity to perform the same or similar functions performed by each corresponding constituent element prior to the integration. Operations performed by the modules, the programs, or the other components according to various embodiments may be executed in a sequential manner, a parallel manner, an iterative manner, or a heuristic manner, at least some of the operations may be performed in a different order or be omitted, or other operations may be added.

Although the embodiments of the disclosure have been illustrated and described above, the embodiments of the disclosure are not limited to the specific embodiments described above, and may be variously modified by those skilled in the art to which the disclosure pertains without departing from the gist of the disclosure claimed in the appended claims, and such modifications should be understood as falling within the technical ideas or prospects of the disclosure.

What is claimed is:

1. An electronic device, comprising:
   a camera;
   a display;
   a memory configured to store at least one instruction; and
   a processor configured to execute the at least one instruction and configured to:
      obtain an image including at least one question through the camera;
      identify the at least one question in the image;
      identify scoring information marked by a user for the at least one question in the image;
      classify the at least one question according to the scoring information;
      based on receiving a first user command for displaying an incorrect answer note, control the display to display a first question classified as an incorrect answer question among the at least one question, wherein the first user command for displaying the incorrect answer note indicates that a student using a learning assistance function has not answered the first question correctly, and wherein the student is the user,
   wherein the scoring information is determined based on a symbol marked by a user in the at least one question, and
   classify the at least one question as one from among a correct answer question, a confirmation question, and the incorrect answer question based on the symbol marked by the user on the at least one question,
   control the display to display one or more questions classified as the incorrect answer question among the at least one question in an order in which the one or more questions are classified as the incorrect answer question,
   identify an achievement level of the user by a question type according to the scoring information; and
   based on receiving a second user command for displaying hint information for the at least one question, control the display to display a UI (User Interface) for displaying the hint information on the at least one question based on the achievement level of the user.

2. The electronic device of claim 1, wherein the processor is configured to execute the stored at least one instruction further to:
   identify at least one paragraph included in the image;
   identify at least one from among text information, image information and equation information included in the at least one paragraph; and
   identify condition information and target information of the at least one question based on the at least one from among the text information, the image information, and the equation information.

3. The electronic device of claim 2, wherein the processor is configured to execute the stored at least one instruction further to:
   obtain a type of each of the at least one question based on at least one from among the image information, the equation information, the condition information and the target information.

4. The electronic device of claim 1, wherein the processor is configured to execute the stored at least one instruction further to:
   based on one of the at least one question being selected by the user, control the display to display at least one similar question corresponding to the selected question, and
   wherein a type of the at least one similar question is same as a type of the selected question.

5. The electronic device of claim 1, wherein the processor is configured to execute the stored at least one instruction further to:
   identify an achievement level of the user by a question type according to the scoring information; and
   control the display to display at least one similar question corresponding to the selected question based on the achievement level.

6. The electronic device of claim 1, wherein the processor is configured to execute the stored at least one instruction further to:
   switch a photographing mode of the camera to a wide-angle mode to acquire a second image including the at least one question.

7. The electronic device of claim 1, wherein the hint information is pre-stored hint template information corresponding to a type of the at least one question.

8. The electronic device of claim 1, wherein the hint information is generated based on a hint template DB (Database) selected by the user among a plurality of hint template DBs.

9. A method for controlling an electronic device, the method comprising:
   obtaining an image including at least one question through a camera of the electronic device;
   identifying the at least one question in the image;
   identifying scoring information marked by a user for the at least one question in the image;
   classifying the at least one question according to the scoring information;
   based on receiving a first user command for displaying an incorrect answer note, displaying a first question classified as an incorrect answer question among the at least one question, wherein the first user command for displaying the incorrect answer note indicates that a student using a learning assistance function has not answered the first question correctly, and wherein the student is the user, wherein the identifying scoring information is based on a symbol marked by a user in the at least one question, classifying the at least one question as one from among a correct answer question, a confirmation question, and the incorrect answer question based on the symbol marked by the user on the at least one question, controlling the display to display one or more questions classified as the incorrect answer question among the at least one question in an order in which the one or more questions are classified as the incorrect answer question;

identifying an achievement level of the user by a question type according to the scoring information; and based on receiving a second user command for displaying hint information for the at least one question, controlling the display to display a UI (User Interface) for displaying the hint information on the at least one question based on the achievement level of the user.

10. The method of claim 9, wherein the identifying the at least one question comprises:

identifying at least one paragraph included in the image;

identifying at least one from among text information, image information and equation information included in the at least one paragraph; and identifying condition information and target information of the at least one question based on the at least one from among the text information, the image information, and the equation information.

11. The method of claim 10, further comprising:

obtaining a type of each of the at least one question based on at least one from among the image information, the equation information, the condition information and the target information.

12. The method of claim 9, further comprising:

based on one of the at least one question being selected by the user, displaying at least one similar question corresponding to the selected question, wherein a type of the at least one similar question is same as a type of the selected question.

13. The method of claim 9, further comprising:

identifying an achievement level of the user by a question type according to the scoring information, wherein the displaying further comprises displaying at least one similar question corresponding to the selected question based on the achievement level.

14. The method of claim 9, wherein the obtaining the image including the at least one question comprises switching a photographing mode of the camera to a wide-angle mode to acquire a second image including the at least one question.

15. The method of claim 9, wherein the hint information is pre-stored hint template information corresponding to a type of the at least one question.

16. The method of claim 9, wherein the hint information is generated based on a hint template DB selected by the user among a plurality of hint template DBs.

17. The method of claim 9, wherein the at least one question includes the first question that was answered incorrectly by the student, and a second question, wherein the second question is a confirmation question, and wherein the confirmation question is: i) correctly answered by the student, but in which a method of arriving at a solution is not clear, or ii) the confirmation question is recognized by the student as an important question requiring further explanation.

* * * * *